United States Patent [19]

Wang et al.

[11] Patent Number: 5,712,805
[45] Date of Patent: *Jan. 27, 1998

[54] NOISE DIAGNOSTIC SYSTEM

[75] Inventors: Zhaoxi Wang, Westland; Sean F. Wu, Troy, both of Mich.

[73] Assignee: Wayne State University, Detroit, Mich.

Related U.S. Application Data

[60] Provisional application No. 60/006,223, Nov. 3, 1995.

[21] Appl. No.: 602,695

[22] Filed: Feb. 16, 1996

[51] Int. Cl.$^6$ .................................................. H04B 15/00
[52] U.S. Cl. ........................ 364/574; 364/413.21; 73/587; 73/602; 73/646; 367/1; 367/8; 367/13; 367/52; 367/129; 367/901
[58] Field of Search ........................ 364/574, 413.21; 73/602, 587, 646; 367/13, 1, 129, 62, 8, 901; 381/71

[56] References Cited

U.S. PATENT DOCUMENTS

| | | | |
|---|---|---|---|
| 3,658,147 | 4/1972 | Ho et al. | 181/5 AP |
| 4,012,689 | 3/1977 | Cox et al. | 324/6 |
| 4,305,295 | 12/1981 | Andersson et al. | 75/589 |
| 4,445,389 | 5/1984 | Potzick et al. | 73/861.27 |
| 4,592,034 | 5/1986 | Sachse et al. | 367/127 |
| 4,598,366 | 7/1986 | Devaney | 364/400 |
| 5,170,433 | 12/1992 | Elliot et al. | 381/47 |
| 5,285,675 | 2/1994 | Colgate et al. | 73/28.2 |
| 5,347,586 | 9/1994 | Hill et al. | 381/71 |
| 5,365,541 | 11/1994 | Bullock | 372/99 |
| 5,381,381 | 1/1995 | Sartori et al. | 367/1 |
| 5,519,637 | 5/1996 | Mathur | 364/508 |

OTHER PUBLICATIONS

The Use of Mathematical–Statistics Methods in the Solution of Incorrectly Posed Problems, May–Jun. 1971, V.F. Turchin et al.

An Iteration Formula Integral Equations of the First Kind, 1951, L. Landweber.

On the Naumerical Solution of Fredhold Integral Equations of the First Kind by the Inversion of the Linear Systems Produced by Quandrature, 1963, S. Towmey.

Well–Posed Stochastic Extensions of Ill–Posed Linear Problems, 1970, Joel N. Franklin.

Sound Source Reconstructions Using a Microphone Array, 1980, Earl G. Williams, et al.

Nearfield Accoustic Holography: I. Theory of Generalized Holography and the Development of NAH, 1985, J.D. Maynard et al.

Nearfield Accoustic Holography (NAH) II. Holographic Reconstruction Algorithms and Computer Implementation, 1987, W.A. Veronesi and J.D. Maynard.

Generalized Nearfield Acoustical Holography for Cylindrical Geometry: Theory and Experiment, 1987, Earl G. Williams and Henry D. Dardy.

Conformal Generalized Near–Field Acoustic Holography for Axisymmetric Geometries, 1990, Girgio V. Borgiotti.

Broadband Acoustic Holography Reconstruction from Acoustic Intensity Measurements. I: Principle of the Method, 1988, Thierry Loyau and Jean–Claude Pascal.

(List continued on next page.)

*Primary Examiner*—Emanual T. Voeltz
*Assistant Examiner*—Hien Vo
*Attorney, Agent, or Firm*—Howard & Howard

[57] ABSTRACT

A method for reconstructing the acoustic field on the surface of a vibrating object based on measurements of the radiated acoustic pressure includes solving the Helmholtz equation directly using the expansion of a set of independent functions that are generated by the Gram-Schmidt orthonormalization with respect to the particular solutions to the Helmholtz equation. The coefficients associated with these independent functions are determined by requiring the assumed form of solution to satisfy the pressure boundary condition at the measurement points. The errors involved in these coefficients are minimized by the least squares method. Once these coefficients are specified, the acoustic pressure at any point, including the source surface, is completely determined.

23 Claims, 9 Drawing Sheets

OTHER PUBLICATIONS

Near Field Acoustic Holography for an Axisymmetric Geometry: A New Formulation, 1990, Sarkissian.

Acoustic Radiation from Finite Structures, 1991, Sarkissian.

Reconstruction of the Surface Acoustic Field on Radiating Structures, 1992, Sarkissian.

Digital Holograhpic Reconstruction of Sources with Arbitrarily Shaped Surfaces, 1989 W.A. Veronesi and J.D. Maynard.

3-D Sound Source Reconstruction and Field Reprediction Using the Helmholz Integral Equation, 1990, G.T. Kim and B.H. Lee.

Application of BEM (Boundary Element Method) Based Acoustic Holography to Radiation Analysis of Sound Sources with Arbitrarily Shaped Geometrics, 1992, Mingsian R. Bai.

An Implant Least Square Method for the Inverse Problem of Acoustic Radiation, '1987, Yei–Chin Chao.

A Noise Source Identification Technique Using an Inverse Helmholtz Integral Equation Method, 1988, B.K. Gardner and R.F. Bernhard.

A Technique for the Numerical Solution of Certain Integral Equation of the First Kind, 1962, David L. Phillips.

Broadband Nearfield Acoustical Holography for Vibrating Cylinders, 1988, Williams, et al.

A Three–Dimensional Acoustic Infinite Element Based on a Prolate Spheroidal Multiple Expansion, 1993, David S. Burnett.

NOISE DIAGNOSTIC SYSTEM

This application claims the benefit of U.S. Provisional Application No. 60/006,223, filed Nov. 3, 1995.

BACKGROUND OF THE INVENTION

The present invention relates generally to a noise diagnostic system and more particularly to a noise diagnostic system utilizing an inventive method, referred to here as the "Helmholtz Equation Least Squares (HELS) Method."

In engineering practice, it is often desired to diagnose noise sources and quantify their strengths in order to reduce resulting noise radiation. Problems of such are categorized by Turchin et al. (1971) as the "inverse problem" which deals with problems of finding unknown sources based on the known consequences. In an inverse acoustic radiation problem, the acoustic quantities on the source surface are determined based on the measured acoustic pressure in the field. One particular application in the automotive industry is to determine the causes of certain amplitudes and frequencies of noises caused by the components of the automobile engine. Generally, a plurality of transducers or microphones are placed near the components of the engine to gather data regarding the frequency and amplitude of the noise caused by the multitude of various components. The data is then analyzed in order to determine which components are causing which frequencies and at which amplitude.

As in all inverse problems, one major difficulty in the inverse acoustic radiation problem is associated with the ill-posedness. By definition, a problem is well-posed if the solution exists, is unique, and depends continuously on the data; otherwise, it is ill-posed. Under most circumstances, an ill-posed problem is very sensitive to the formulations used, and solutions thus obtained do not depend continuously on the auxiliary data. As a result, a slight error in the measured data may lead to an enormous error in the reconstruction of the acoustic quantities on the surface.

The inverse problems have been the subject of extensive studies for the past few decades (Landweber, 1951; Twomay, 1963; Franklin, 1970) and have been documented in detail by many people. The present invention is mainly concerned with an inverse acoustic radiation problem, namely, the reconstruction of the acoustic field on the surface of a vibrating structure from the measurements of the radiated acoustic pressure in the field.

An early approach to the reconstruction of the acoustic field on the surface of a planar source is through near field acoustic holography (NAH) together with a two-dimensional fast Fourier transformation (FFT) algorithm (Williams et al., 1980; Maynard et al., 1985; Veronesi and Maynard, 1987). However, this technique requires hundreds or thousands of transducers placed at extremely close range to the components. Further, this technique only works for very simple-geometry components.

This approach was extended, called the generalized near field acoustic holography (GENAH), to cylindrical sources by Williams and Dardy (1987), and further to non-separable geometries by Borgiotti et al. (1990). In order to take into account of the evanescent field, the hologram surface on which measurements were taken must be very close to the source surface, within one-half wavelength (Loyau and Pascal, 1988). Sarkissian (1990, 1991, 1992) developed an algorithm based on an expansion of the surface field in terms of a set of real functions for the far-field acoustic holography. All these algorithms were limited to source surfaces with simple geometric shapes. Further, these techniques all required hundreds or thousands of transducers placed at very close range to the sources.

In the early 1990's, the boundary element method (BEM)-based Kirchhoff integral theory were used to generate a transformation matrix that correlated the field acoustic quantities to the surface ones in order to reconstruct the acoustic field on an irregularly-shaped surface (Veronesi and Maynard, 1989; Kim and Lee, 1990; Bai, 1992). However, the matrix thus obtained was singular. Hence singular value decomposition (SVD) was used to filter out the evanescent waves and to regularize the matrix. Chao (1987) used an implicit least-square method to approximate the reconstruction of the surface acoustic field by minimizing the errors associated with the integral equation approach. Gardner and Bernhard (1988) tried this integral equation approach for an inverse acoustic radiation problem inside a cavity. Numerical examples indicated that the reconstruction error in the interior problem had the same order of magnitude as that in the exterior problem.

Generally speaking, the BEM-based Kirchhoff integral formulation is a natural approach to reconstruct the acoustic field on the surface of an irregularly-shaped object. The main advantage of this approach is the reduction of the dimensions of the problem by one, thus significantly improving the efficiency of numerical computations. However, this approach has two inherent drawbacks resulting from transforming the wave equation into the Fredholm integral equation of the first and second kinds, respectively. The first drawback is associated with the well-known nonuniqueness of the surface Kirchhoff integral equation, and the second is with the ill-conditioning of the transformation matrix which makes the inverse acoustic radiation problem an ill-posed one. The first drawback can be overcome by using the CHIEF method, provided that the overdetermined points are properly selected. The second drawback is less straightforward to deal with than the first one.

To show the existence of the ill-conditioning difficulty, consider a general Fredholm integral equation of the first kind $$\int_a^b K(x,y)f(y)dy = g(x), a \leq x \leq b, \quad (1)$$

where $K(x,y)$ is an arbitrary, integrable kernel, $g(x)$ is given, and $f(y)$ is the sought function. Phillips (1962) has shown that there is no successful way of solving $f(y)$ for an arbitrary kernel $K(x,y)$ when $g(x)$ is specified with only modest accuracy. The reason for that is quite simple: while Eq. (1) can yield $g(x)$ for a given $K(x,y)$ and $f(y)$, its inverse may not be bounded. This can be seen as follows. Let $f(y)$ be the solution to Eq. (1) and add to it a fluctuation $f_m = \sin(my)$. Substituting $f(y)$ into Eq. (1) then yields $$\int_a^b K(x,y)\sin(my)dy = g_m(x), a \leq x \leq b. \quad (2)$$

Since for any integrable kernel, the function $$g_m(x) \equiv \int_a^b K(x,y)\sin(my)dy \to 0$$

as $m \to \infty$. Hence an infinitesimal change $g_m(x) \neq 0$ in $g(x)$ will cause a finite change $f_m$ in $f(y)$. Also, we expect that $g_m(x) \to 0$ as $m \to \infty$ faster for a flat smooth kernel than for a sharply peaked one. Hence the success in solving $f(y)$ for a given g(x) depends to a large extend on the accuracy of g(x) and the shape of K(x,y).

Because of the presence of this inherent ill-posedness in the Kirchhoff integral formulation, any slight inaccuracy in the measurements may lead to an erroneous result in the reconstruction. Since all measurements will inevitably involve certain levels of uncertainties either due to random fluctuations or due to the effect of the evanescent waves that decay rapidly as they propagate away from the surface, this ill-posedness can be a real threat to the success of the inverse acoustic radiation problem. Even slight errors in measurements will lead to erroneous reconstruction. Generally, measurement errors are magnified hundreds of times or thousands of times by this technique. One partial solution is to take numerous measurements at close range. SVD can be used to truncate the order of the matrix and regularize it, thus reducing but not eliminating the reconstruction error. The procedures involved in SVD, however, are time-consuming, especially at high frequencies. Even with the regularization, the accuracy of reconstruction is still limited to the near field (Kim and Lee, 1990). Moreover, how to handle small singular values in SVD is still a problem open to investigation (Veronesi and Maynard, 1989).

SUMMARY OF THE INVENTION

In the present invention, a plurality of transducers measure the amplitude and frequency of sound at a plurality of points in the field surrounding the noise sources. The transducers are connected to a signal analyzer which generates frequency versus amplitude data. The frequency/amplitude data is input to a computer which reconstructs the acoustic field at the noise source surface to diagnose the noise sources.

The reconstruction of the acoustic field is tackled by directly solving the Helmholtz equation. The acoustic pressure on the surface of an object is expressed in terms of a set of independent functions which are generated by the Gram-Schmidt orthonormalization with respect to the particular solutions to the Helmholtz equation. The coefficients associated with the independent functions are determined by requiring the assumed form of solution to satisfy the pressure boundary condition at the measurement points. The errors involved in the coefficients are then minimized by the least squares method. Once these coefficients are specified, the acoustic pressure at any point, including the source surface, is completely determined. Hence this method is not only applicable to reconstruction of the acoustic field on the source surface, but also to the forward acoustic radiation problem. Moreover, it can be applied to sources with both separable and non-separable coordinates.

DETAILED DESCRIPTION OF A PREFERRED EMBODIMENT

Figure 1:
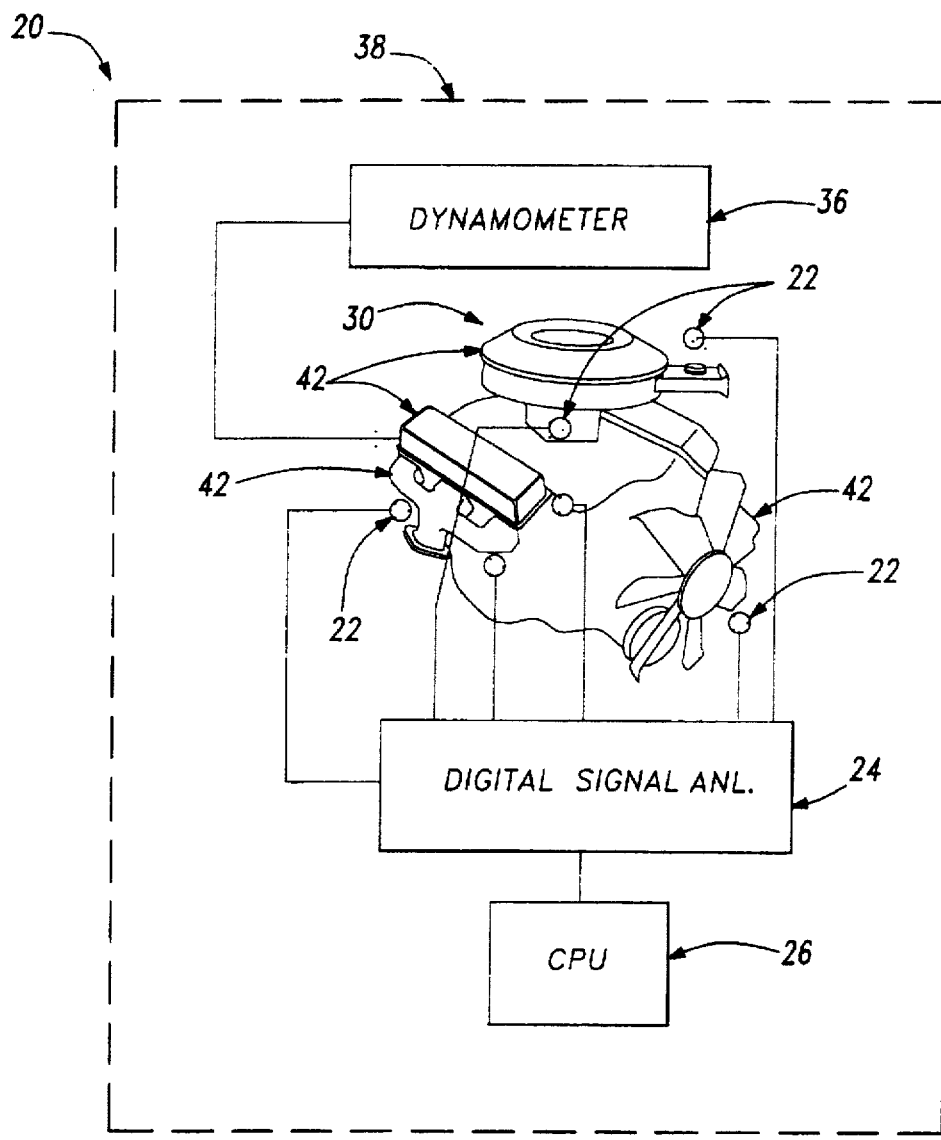
FIG. 1 is a schematic of a noise diagnostic system in accordance with the present invention.

A noise diagnostic system 20, free of both non-uniqueness and ill-posedness difficulties, according to the present invention is shown in FIG. 1. The noise diagnostic system 20 generally comprises a plurality of transducers 22, or microphones connected to a signal analyzer 24. Alternatively, a digital sound processing computer board could be used as a signal analyzer 24. The noise diagnostic system 20 further includes a computer 26 receiving and analyzing the data from the signal analyzer 24.

The noise diagnostic system 20 can be used to diagnose noise sources and quantify their strengths in order to facilitate efforts to reduce noise levels. For illustrative purposes only, and not by way of limitation, the present invention will be shown and described for use in diagnosing the sources of noise from automobile engine 30.

The automobile engine 30 is preferably connected to a dynamometer 36 inside an anechoic chamber 38. At least two transducers 22 are placed adjacent the engine components 42 inside the anechoic chamber 38.

In operation, the transducers 22 measure the frequency and amplitude of noise while the engine 30 is running. The gathered data is sent to the signal analyzer 24 which indicates amplitude as a function of frequency. This frequency/amplitude data is sent to the computer 26. The computer 26 determines the amplitudes of each frequency caused by each engine component 42 by reconstructing the acoustic field on the surface of the components 42 based upon the frequency/amplitude data from the signal analyzer 24. The computer 26 utilizes a method which will be referred to here as the "Helmholtz Equation-Least Squares, or HELS, Method,"

more fully explained below, to obtain the noise source distribution. This noise source distribution facilitates the reduction of noise by identifying the engine components 42 which are generating certain amplitudes and frequencies.

Figure 2:
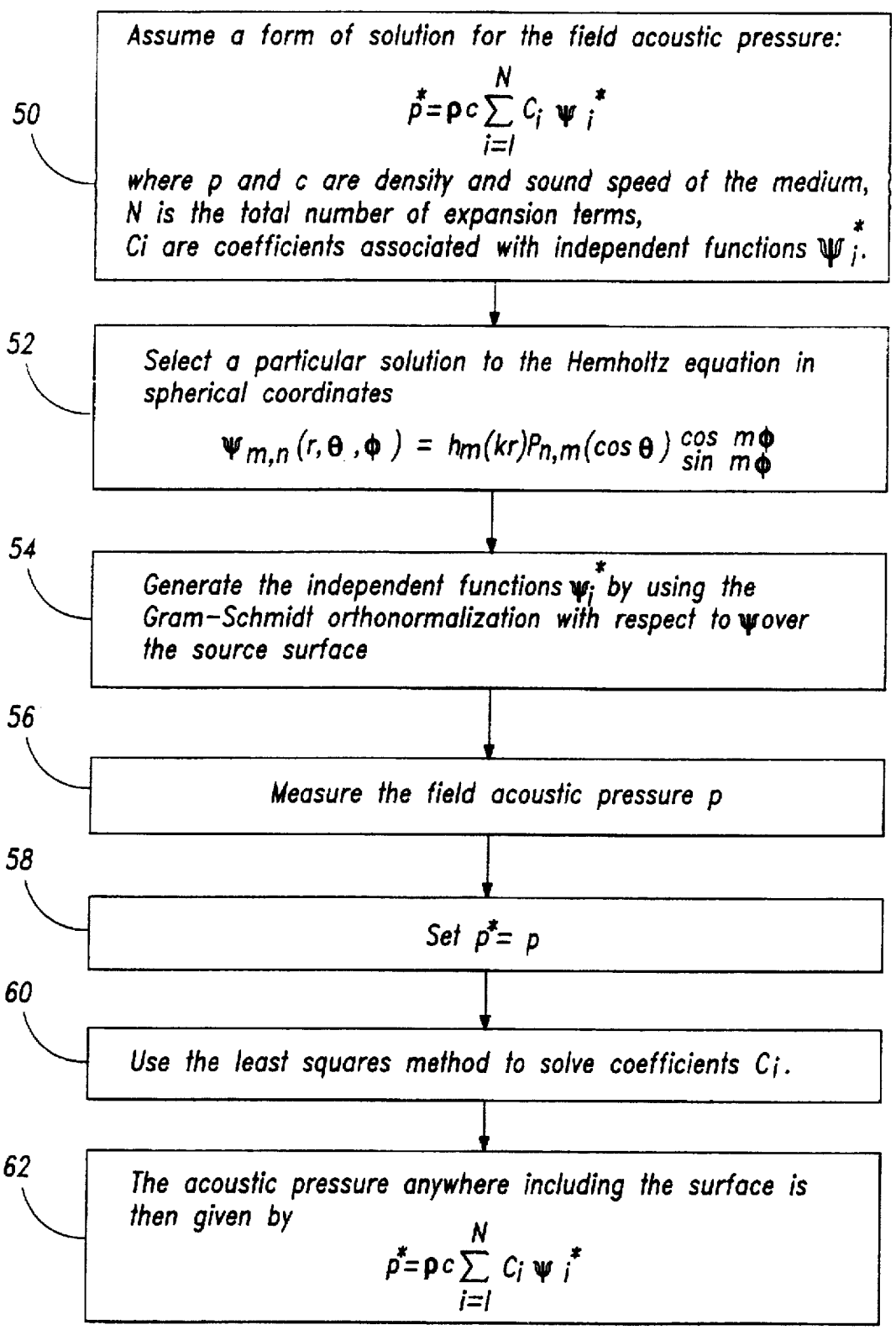
FIG. 2 is a flowchart for the computer of the noise diagnostic system of FIG. 1.

FIG. 2 is a flowchart overview of the HELS method. In step 50, the solution for the field acoustic pressure is assumed to take the form $$p^* = \rho c \sum_{i=1}^{N} C_i \psi^*_i,$$

In step 52, a particular solution to the Helmholtz equation can be selected in spherical coordinates $$\psi_{m,n}(r,\theta,\phi) = h_m(kr) P_{n,m}(\cos\theta) \genfrac{}{}{0pt}{}{\cos m\phi}{\sin m\phi}$$

In step 54, the independent functions $\psi_i^*$ are generated by using the Gram-Schmidt orthonormalization with respect to $\psi$ over the source surface. In step 56, the field acoustic pressure p is measured at a plurality of points, using the transducers 22. In step 58, the field acoustic pressure p* is set equal to the measured field acoustic pressure p. In step 60, the coefficients $C_i$ are solved using the least squares method. The acoustic pressure at any point, including the surfaces of the components 42 is then given by $$p^* = \rho c \sum_{i=1}^{N} C_i \psi^*_i,$$

The Fundamental Theory of the Helmholtz Equation-Least Squares Method utilized by the noise diagnostic system of the present invention is discussed below. Then Numerical Examples of Reconstructions of Acoustic Fields on Source Surfaces with both separable and non-separable coordinates are presented.

FUNDAMENTAL THEORY

I. Boundary Value Problems for the Helmholtz Equation

The radiated acoustic pressure in the field satisfies the wave equation, whose Fourier transformation is the so-called reduced wave equation or the Helmholtz equation.

$$\mathcal{L}(p) = \nabla^2 p + k^2 p = 0, \quad (3)$$

where a hat for the complex pressure $\hat{p}$ is dropped for brevity and k is the wave number.

Equation (3) may be subject to one of the following three types of boundary conditions $$p(\vec{x}_\beta) = g(\vec{x}_\beta), \text{ Dirichlet problem} \quad (4)$$

$$\frac{\partial p(\vec{x}_\beta)}{\partial n} = g(\vec{x}_\beta), \text{ Neumann problem}$$

$$a(\vec{x}_\beta) p(\vec{x}_\beta) + b(\vec{x}_\beta) \frac{\partial p(\vec{x}_\beta)}{\partial n} = g(\vec{x}_\beta),$$

Mixed or Robin problem where $\vec{x}_\beta \in \partial\beta$, a, b, and g are specified, and $\partial/\partial n$ represents the normal derivative on the boundary $\partial\beta$.

Solutions to Eq. (3) subject to boundary conditions (4) can be approximated by a linear combination of the independent functions $\psi^*$ $$p^* = \rho c \sum_{i=1}^{N} C_i \psi^*_i, \quad (5)$$

where $\rho$ and c are the density and speed of sound of the fluid medium, respectively. The independent functions $\psi_i^*$, can be selected in such a way that they satisfy any one of the following three conditions (Birkhoff and Lynch, 1984):

(i) $\psi_i^*$ satisfy the differential equation, but not the boundary condition;

(ii) $\psi_i^*$ do not satisfy the differential equation, but $\psi_1^*$ satisfies the boundary conditions and $\psi_2^*, \psi_3^*, \ldots$ satisfy the homogeneous boundary conditions; or (iii) $\psi_i^*$ satisfy neither the differential equation nor the boundary conditions.

For a differential equation in multiple dimensions $$\mathcal{L}[p(\vec{x})] = 0, \quad \vec{x} \in \beta \quad (6)$$

subject to the boundary condition with an operator A $$A[p(\vec{x}_\beta)] = G(\vec{x}_\beta), \quad \vec{x}_\beta \in \partial\beta \quad (7)$$

we can select the independent functions $\psi_i^*$ that satisfy any one of the following three integrals (Lieberstein, 1960) and then seek the values of the coefficients $C_i$ $$(iv) \, I = \int_{\partial\beta} W_1(\vec{x}_\beta) \{G(\vec{x}_\beta) - A[p^*(\vec{x}_\beta)]\}^2 dS \quad (8)$$

$$(v) \, I = \int_{\beta} W_1(\vec{x}) \mathcal{L}^2[p^*(\vec{x})] dV$$

$$(vi) \, I = \int_{\beta} W_2(\vec{x}) \mathcal{L}^2[p^*(\vec{x})] dV +$$

$$\int_{\partial\beta} W_3(\vec{x}_\beta) \{G(\vec{x}_\beta) - A[p^*(\vec{x}_\beta)]\}^2 dS$$

which render the integrals in Eq. (8) minimum. Here $W_i$, i=1, to 3, are the weighting functions, and dV and dS are integration elements in the region $\beta$ and on the boundary $\partial\beta$, respectively. Once the coefficients $C_i$, are determined, the acoustic pressure anywhere can be approximated by Eq. (5).

In the present invention, attention is focused on the Helmholtz equation (3) subject to the boundary condition (4), and the independent functions $\psi_i^*$ that satisfy the condition (i) are selected.

II. Orthonormalization of Independent Functions $\psi_i^*$

An important step in the present method is to orthonormalize the independent functions $\psi_i^*$ on the source surface with respect to the particular solutions $\psi_i^*$ to the Helmholtz equation (3). In terms of the spherical coordinates the Helmholtz equation can be written as $$\frac{1}{r^2} \frac{\partial}{\partial r} \left( r^2 \frac{\partial p}{\partial r} \right) + \frac{1}{r^2 \sin\theta} \frac{\partial}{\partial \theta} \left( \sin\theta \frac{\partial p}{\partial \theta} \right) + \quad (9)$$

$$\frac{1}{r^2 \sin^2\theta} \frac{\partial^2 p}{\partial \phi^2} + k^2 p = 0,$$

subject to the Dirichlet boundary condition, Eq. (4), and the Sommerfeld's radiation condition, $$\lim_{r \to \infty} \left[ r \left( \frac{\partial p}{\partial r} - ikp \right) \right] = 0. \tag{10}$$

The approximate solution to Eq. (9) can be written in the form of Eq. (5), with $\psi_i^*$ being generated by a linear combination of the particular solutions to the Helmholtz equation $\psi_i^*$ (Vekua, 1953)

$$\psi_{m,n}(r,\theta,\phi) = h_m(kr) P_{n,m}(\cos\theta) \begin{array}{c} \cos m\phi \\ \sin m\phi \end{array} \tag{11}$$

where $h_m$ and $P_{n,m}$ denote the spherical Hankel function and the Legendre function, respectively. The former corresponds to an outgoing wave, appropriate for situations where the acoustic energy is radiating outward into an unbounded medium. The amplitude of such a wave tends to infinity at r=0. However, this does not preclude using it for the present purpose since no physical source has zero radius, and the point r=0 is excluded in the function that is valid only outside the source. For a wave in the interior of an enclosure, where r may be zero, we define the spherical Bessel function $\mathfrak{J}_m(z)$ as the real part of $h_m(z)$, and the spherical Neumann function $N_m(z)$ as the imaginary part of $h_m(z)$ (Morse and Ingard, 1968).

$$h_m(z) = \mathfrak{J}_m(z) + i N_m(z), \ \mathfrak{J}_m \text{ and } N_m \text{ real} \tag{12}$$

The imaginary part $N_m$ are subsequently discarded because they have no physical meaning as r→0. The real part $\mathfrak{J}_m$ are retained as the particular solutions to the Helmholtz equation for an interior problem, such as for diagnosing noise sources in a passenger compartment of a vehicle.

The functions $\psi_i$ given by Eq. (11) are readily applicable to a spherical source, but may not be ideal for an irregularly-shaped source geometry, especially for those that contain sharp edges, for then a large number of terms in the expansion may be required. However, in engineering applications true sharp edges are rare. They are often rounded. Also, the radiated acoustic pressure from a finite, irregularly-shaped source obeys the spherical spreading law in the far field. Hence Eq. (11) may still be used as an appropriate approximation.

The independent function $\psi_i^*$ can now be generated by the Gram-Schmidt orthonormalization with respect to $\psi_i$ (Pinsky, 1991).

$$\chi_1 = \psi_1, \qquad \psi_i^* = \chi_1/\|\chi_1\| \tag{13}$$
$$\chi_2 = \psi_2 - (\psi_2, \psi_i^*) \psi_1^*, \qquad \psi_2^* = \chi_2/\|\chi_2\|$$
$$\cdot \qquad \cdot$$
$$\cdot \qquad \cdot$$
$$\chi_{n+1} = \psi_{n+1} - \sum_{i=1}^{n} (\psi_{n+1}, \psi_i^*) \psi_i^*, \qquad \psi_{n+1}^* = \chi_{n+1}/\|\chi_{n+1}\|$$

where the inner products are taken over the source boundary $\partial\beta$, $$(\psi_i, \psi_j^*) = \int_{\partial\beta} \psi_i \psi_j^* dS \tag{14}$$

The independent functions $\psi_i^*$ thus obtained are orthonormal for any source surface $$(\Psi_i^*, \Psi_j^*) = \delta_{ij} \tag{15}$$

where $\delta_{ij}$ is the Dirac delta function. Also, they are uniformly convergent because $\psi_i$ consist of a uniformly convergent series of Legendre functions (Bergman, 1960).

III. Example of Orthonormalization

To demonstrate the orthonormalization process discussed above, let us consider the following Laplace equation (Kantorovich and Krylov, 1958) subject to boundary conditions $$\frac{\partial^2 u}{\partial x^2} + \frac{\partial^2 u}{\partial y^2} = 0 \tag{16}$$

$$u(x, \pm 1) = 1 - x^2 \quad u(\pm 1, y) = 1 - y^2. \tag{17}$$

The harmonic function u is sought in a rectangular region [−1,1; −1,1] with the specified Dirichlet boundary condition (17). The approximate solution to Eq. (16) can be written as $$u^*(x,y) = \sum_{i=1}^{N} D_i \psi_i^*. \tag{18}$$

The first step in solving this problem is to choose a complete set of particular solutions $\psi_i$ to the Laplace equation (16), from which the independent functions $\psi_i^*$ can be generated. Although trigonometric functions are a good choice for the particular solutions to a rectangular region, we still use ($r^n \cos n\theta, r^n \sin n\theta$) to form the particular solutions for the purpose of demonstration. The first few terms of the particular solutions can be written as 1, (x,y), ($x^2-y^2$, 2xy), ($x^3-3xy^2$, $3x^2y-y^3$), ($x^4-6x^2y^2+y^4, 4x^3y-4xy^3$), . . . .

Next, we apply the Gram-Schmidt orthonormalization to the particular solutions $\psi_i$ to generate the independent functions $\psi_i^*$. Because of the symmetry of the boundary condition (17) on $\psi_i$, we only need consider the even functions, namely, 1, ($x^2-y^2$), ($x^4-6x^2y^2+y^4$), . . . .

The first particular solution is $\psi_1=1$, whose normalization with respect to the boundary $\partial\beta$ is $$\|\chi_1\| = \int_{\partial\beta} 1^2 dS = 8.$$

Hence the first independent function is $\psi_{1*}=1/\sqrt{8}$.

For the second function $\psi_2=(x^2-y^2)$, we first calculate the inner product $$(\psi_2, \psi_1^*) = \int_{\partial\beta} 1(x^2 - y^2) dS = 0,$$

which means that $\psi_1^*$ and $\psi_2$ are orthogonal. Thus, we can set $\chi_2=\psi_2$. The normalization of $\chi_2$ yields $$\|\chi_2\| = \int_{\partial\beta} (x^2 - y^2)^2 dS = \frac{64}{15},$$

Therefore the second independent function $\psi_2^* = \sqrt{15/64}(x^2-y^2)$.

The third independent function $\psi_3^*$ can be obtained in a similar manner. The inner products of $\psi_3$ with respect to $\psi_1^*$ and $\psi_2^*$ are $$(\psi_3, \psi_1^*) = \int_{\partial\beta} (x^4 - 6x^2y^2 + y^4) \frac{1}{\sqrt{8}} dS = -\frac{6.4}{\sqrt{8}},$$

-continued $$(\psi_3, \psi_2^*) = \int_{\partial\beta} (x^4 - 6x^2y^2 + y^4)\sqrt{\frac{15}{64}}(x^2 - y^2)dS = 0.$$

From Eq. (13), $x_3$ is given by $$\begin{aligned}\chi_3 &= \psi_3 - (\psi_3,\psi_1^*)\psi_1^* - (\psi_3,\psi_2^*)\psi_2^2 \\ &= x^4 - 6x^2y^2 + y^4 + \frac{6.4}{\sqrt{8}}\frac{1}{\sqrt{8}}.\end{aligned}$$

After the normalization we obtain $$\psi_3^* = \frac{\chi_3}{\|\chi_3\|} = 0.2244(x^4 - 6x^2y^2 + y^4 + 0.8).$$

Once $\psi_i^*$ are specified, the coefficients $D_i$ in Eq. (18) can be determined by requiring $u^*$ to satisfy the prescribed boundary conditions (17)

$$\sum_{i}^{N} D_i\psi_i^*(x_\beta,y_\beta) = u(x_\beta,x_\beta), \quad (19)$$

where $(x_\beta,y_\beta) \in \beta$.

Since $\psi_i^*$ are orthonormal with respect to the boundary $\partial\beta$, we can solve $D_i$ by multiplying both sides of Eq. (19) by $\psi_j^*$ and then integrating over $\partial\beta$ $$\begin{aligned}D_1 &= \int_{\partial\beta} u(x_\beta,y_\beta)\psi_1^*(x_\beta,y_\beta)dxdy \\ &= 4\int_{-1}^{1}\frac{1}{\sqrt{8}}(1-\xi^2)d\xi = \frac{4\sqrt{2}}{3}, \\ D_2 &= \int_{\partial\beta} u(x_\beta,y_\beta)\psi_2^*(x_\beta,y_\beta)dxdy \\ &= 2\int_{-1}^{1}\sqrt{\frac{15}{64}}(\xi^2-1)(1-\xi^2)d\xi + \\ &\quad 2\int_{-1}^{1}\sqrt{\frac{15}{64}}(1-\xi^2)(1-\xi^2)d\xi \equiv 0, \\ D_3 &= \int_{\partial\beta} u(x_\beta,y_\beta)\psi_3^*(x_\beta,y_\beta)dxdy \\ &= 0.2244 \times 4\int_{-1}^{1}(\xi^4 - 6\xi^2 + 1.8)(1-\xi^2)d\xi \\ &= 0.8206.\end{aligned}$$ (20)

Substituting Eqs. (20) into (18) yields the approximate solution $u^*$ $$u^*(x,y) = \frac{2}{3} + 0.1841(x^4 - 6x^2y^2 + y^4 + 0.8). \quad (21)$$

In this case, the approximate result at origin is $u(0,0)=0.814$ and the exact solution is 0.816. More accurate results can be obtained by taking more expansion terms in Eq. (18).

IV. The Least Squares Method

Now we derive the formulation for reconstructing the acoustic field on the surface of a vibrating object based on measurements of the radiated acoustic pressure in the field. Such a process is referred to here as the Helmholtz Equation-Least Squares (HELS) method, because it essentially solves the Helmholtz equation using the least squares method.

Consider a closed, smooth, and impermeable surface $\partial\beta$ immersed in an unbounded medium $\beta$. Assume that the surface is vibrating at a constant angular frequency $\omega$, and that there are no other sources in the medium except the vibrating surface. The acoustic pressure at an arbitrary field point p then satisfies the Helmholtz equation (9) and the Sommerfeld radiation condition (10).

Now, given the source location, geometric shape, and boundary conditions at the measurement points in the field $$p(\vec{x}_s) = p_0(\vec{x}_s), \quad (22)$$

we wish to reconstruct the acoustic field on the source surface.

The first step in solving this problem is to express $p^*$ as a sum of independent functions $\psi_i^*$, Eq. (5). Here the independent functions $\psi_i^*$ are generated from a complete set of particular solutions $\psi_i$, given by Eq. (11), through the Gram-Schmidt orthonormalization, Eq. (13). The inner products in the orthonormalization process must be taken over the entire source boundary $\partial\beta$ using the Gaussian quadrature technique (Wang, 1995).

Next, the coefficients $C_i$ associated with the independent functions $\psi_i^*$ are determined by requiring the assumed form of solution, Eq. (5), to satisfy the boundary conditions at the measurement points, Eq. (22). Suppose that an N term expansion in Eq. (5) is used, and that M measurements are taken, where $M \geq N$. Then we can form M-simultaneous algebraic equations for N unknowns $$\begin{bmatrix} \psi_{11}^* & \psi_{12}^* & \cdots & \psi_{1N}^* \\ \psi_{21}^* & \psi_{22}^* & \cdots & \psi_{2N}^* \\ \vdots & \vdots & & \vdots \\ \psi_{N1}^* & \psi_{N2}^* & \cdots & \psi_{NN}^* \\ \vdots & \vdots & & \vdots \\ \psi_{M1}^* & \psi_{M2}^* & \cdots & \psi_{MN}^* \end{bmatrix} \begin{Bmatrix} C_1 \\ C_2 \\ \vdots \\ \vdots \\ C_N \end{Bmatrix} = \begin{Bmatrix} p_{01} \\ p_{02} \\ \vdots \\ p_{0N} \\ \vdots \\ p_{0M} \end{Bmatrix}. \quad (23)$$

If the measured data $p_0$ are exact, then the approximate solution $p^*$ converges to the true value as $N \to \infty$ (Davis and Rabinowitz, 1961). However, in reality the measured data always contain certain amount of uncertainties either due to random fluctuations or due to the effect of evanescent waves that decay rapidly as they propagate away from the source. Hence, the approximate solution will not converge to the true one. Nevertheless, the error involved in the approximate solution can be minimized by the least squares method $$I = \sum_{m=1}^{M}\left(\rho c \sum_{n=1}^{N} C_n \psi_{mn}^* - p_{0m}\right)^2, \quad (24)$$

Substituting the left side of Eq. (23) into (24) and taking the derivatives of the resultant equation with respect to each individual coefficient $C_i$, we obtain $$\frac{\partial I}{\partial C_i} = \frac{\partial}{\partial C_i}\left[\sum_{m=1}^{M}\left(\rho c \sum_{n=1}^{N} C_n \psi_{nm}^* - p_{0m}\right)^2\right] \quad (25)$$

$$= \sum_{m=1}^{M} 2\left(\rho c \sum_{n=1}^{N} C_n \psi_{nm}^* - p_{0m}\right)\frac{\partial}{\partial C_i}\left(\rho c \sum_{n=1}^{N} C_n \psi_{nm}^*\right)$$

$$= 2\left((\rho c)^2 \sum_{m=1}^{M} \psi_{mi}^* \sum_{n=1}^{N} C_n \psi_{nm}^* - \sum_{m=1}^{M} p_{0m}\psi_{mi}^*\right) = 0,$$

$i = 1, 2, \ldots, N$

Equation (25) can be put in a matrix form $$[\Im]_{M \times N}\{C\}_{N \times 1} = \{\beta\}_{M \times 1}, \quad M \geq N, \quad (26)$$

where $[\Im]$ represents the transformation matrix that correlates the field measurement to the acoustic field on the source surface, and $[\beta]$ is the matrix that contains the boundary condition. The elements of $[\Im]$ and $[\beta]$ are given by $$\Im_{mi} = \sum_{n=1}^{N} \psi_{nm}^* \psi_{ni}^*, \quad (27a)$$

$$\beta_m = \sum_{n=1}^{N} p_{0n}\psi_{nm}^*. \quad (27b)$$

Note that the transformation matrix $[\Im]$ is non-singular. Hence the coefficients $C_i$ can be solved by inverting the matrix $[\Im]$ $$\{C\}_{N \times 1} = [\Im]_{N \times M}^{\mu}\{\beta\}_{M \times 1}, \quad (28)$$

where $$[\Im]_{N \times M}^{\mu} = ([\Im]^T[\Im])^{-1}[\Im]^T$$

is called the pseudoinverse, here a superscript T stands for the transposition of a matrix. It can be shown that the condition number of the pseudoinverse is much smaller than that of a direct inverse (Stewart, 1973), hence the system of equations (28) is stable and the accuracy of numerical results for $\{C\}$ is high.

Note that in deriving Eq. (28) no restrictions have been imposed on the measurement points. They need not be confined to a surface conformal to the source boundary. They can be taken at any point in the field so long as they do not overlap each other. Of course the more measurement points are taken, the more accurate the reconstruction will be. It will be shown, however, that using the present method, a satisfactory reconstruction can be obtained with much less measurement points as compared with the traditional Kirchhoff integral formulation approach. The only thing one needs to keep in mind is that the orthonormalization must be taken with respect to the source surface $\partial\beta$, but not the measurement surface.

Once the coefficients $C_i$ are solved, the surface acoustic pressure can be determined simply by substituting the surface coordinates into Eq. (5). In fact, the acoustic pressure is now expressed as a function of the measurement coordinates. Hence Eq. (5) can be used to predict the radiated acoustic pressure as well.

We emphasize here that the present method uses the expansion theory to solve the Helmholtz equation directly, and the errors involved in the expansion are minimized by the least squares method. Hence it is free of the nonuniqueness and ill-conditioning difficulties inherent in the Kirchhoff integral formulation approach. It will be shown that such an approach has a high tolerance in the inaccuracy in the measured data. This characteristic is very appealing because in engineering applications all measurements contain certain levels of uncertainties.

V. Analysis of Error Bounds

One of the advantages that accrues from the least squares method is that it makes the error estimation simple and readily available once the computation is completed. The proof of the least squares error and degree of convergence are well-known, see for example the papers by Nehari (1956) and Dais and Rabinowitz (1961). Examples of estimating the least squares error can also be found in the paper of Hochstrasser (1958). For completeness, we simply cite a brief account of the least squares error analysis by Davis and Rabinowitz (1961).

Let $\beta$ be a convex domain and let $u(z)(=u(x,y))$ be harmonic in $\beta$. Designate its values on $\partial\beta$ by $u(s)$. Let $u_1, u_2, \ldots, u_n$ be n harmonic functions which are orthonormal in the sense that $$\int_{\partial\beta} u_m(s)u_n(s)ds = \delta_{mn}. \quad (29)$$

If $a_n$ are the Fourier coefficients of u with respect to $u_n$, $$a_n = \int_{\partial\beta} u(s)u_n(s)ds \quad (30)$$

then $$\left[u(z) - \sum_{m=1}^{n} a_m u_m(z)\right]^2 \leq \left[\int_{\partial\beta} u^2(s)ds - \sum_{m=1}^{n} a_m^2\right] \times \quad (31)$$

$$\left[\frac{1}{2\pi^2}\int_{\partial\beta}\frac{ds}{|z-z_p|^2} - \sum_{m=1}^{n} u_m^2(z)\right].$$

Here $z_p$ designates a point on $\partial\beta$ and Eq. (31) is valid for $z \in \beta$. When the system $u_1, u_2, \ldots$, is complete in the space of harmonic functions $u(z)$ with $\int_{\partial\beta} u^2(s)ds < \infty$, the first bracket in the right-hand side approaches zero (Parseval's equation) and Eq. (31) exhibits the pointwise convergence of the Fourier series $\sum_{m=1}^{\infty} a_m u_m(z)$ to the solution of the first boundary value problem.

In the present situation, the sought function is p, which is specified at the measurement point as $p_0(\vec{x}_s)$, and the approximated one is p*, which is expressed as a sum of independent functions $\psi_i^*$ given by Eq. (5). The mean square of the difference between $p(\vec{x})$ at any point in the field and the approximated one $pc\sum_{i=1}^{N} C_i\psi_i^*(\vec{x})$ is bounded by $$\left[p(\vec{x}) - \rho c \sum_{i=1}^{N} C_i\psi_i^*(\vec{x})\right]^2 \leq \left[\int_s p_0^2(\vec{x}_s)dS - (\rho c)^2 \sum_{i=1}^{N} C_i^2\right] \times \quad (32)$$

$$\left[\frac{1}{2\pi^2}\int_s \frac{dS}{|\vec{x}-\vec{x}_s|^2} - \sum_{i=1}^{N} \psi_i^{*2}(\vec{x})\right],$$

where the integrals on the right side of Eq. (32) are carried over the measurement surface.

Note that the functions $\psi_i^*$ are complete and bounded (because $\psi_i$ are complete and bounded), and the radiated acoustic pressure p is harmonic and bounded $$\int_s p_0^2(\vec{x}_s) dS < \infty.$$

Hence if the measured value of $p_0$ is exact, the first bracket on the right side of Eq. (32) is identically zero and the approximate solution $pc\Sigma_{i=1}^N C_i \psi_i^*(\vec{x})$ converges to the true solution as $N \to \infty$. In reality, however, the measured acoustic pressure $p_0$ always contains certain level of uncertainties. Therefore the first bracket on the right side of Eq. (32) is of a finite value.

NUMERICAL RESETS

The HELS method developed above is used here to reconstruct the acoustic fields on various source surfaces. Sources of both separable and non-separable coordinates are considered. Excellent agreements between the reconstructed acoustic fields and the preselected ones are obtained in all cases. A sensitivity analysis of the HELS method on the level of uncertainties involved in the input data is also carried out. To examine the robustness of the HELS method, some artificial bias and random errors are introduced into the input data. These erroneous input are then used to reconstruct the acoustic field on the source surface, and the magnitudes of the errors are compared to those of the input. Numerical results demonstrate that while the bias errors are transferred to the reconstruction at the same level, the random errors are actually reduced. Under no circumstance will the errors be amplified during the reconstruction. Further, the measurement points need not be limited to the near field or to a conformal surface. They can be anywhere so long as they do not overlap each other.

VI. Examples of Acoustic Field Reconstruction

In this section, numerical examples of the reconstruction of the acoustic fields on various types of source surfaces are shown. Sources with both separable and non-separable coordinates are considered. In all cases, a surface velocity distribution is preselected. The acoustic pressures on the source surface and in the field are then calculated. The field acoustic pressures are taken as the measured quantities to reconstruct the surface acoustic pressures, which are subsequently compared with the predetermined ones on the surface.

(i) Sources with separable coordinates

The examples concerned with sources with separable coordinates include a dilating sphere, an oscillating sphere, and a vibrating piston set in a sphere. In what follows, we first consider the case of a dilating sphere. The complex amplitude of the radiated acoustic pressure from a dilating sphere is given by (Pierce, 1981)

$$p = \frac{-ik\rho c a^2 V_S}{r(1-ika)} e^{ik(r-a)}, \quad (2)$$

where $p$ and $c$ are the density and speed of sound of the fluid medium, respectively, $V_s$ is the amplitude of the surface velocity, and $a$ is the radius of the sphere.

The approximated acoustic pressure is given by Eq. (1). The independent functions $\psi i^*$ are generated by the Gram-Schmidt orthonormalization with respect to the particular solutions $\psi_i$ to the Helmholtz equation $$\psi_i(r,\theta) = h_i(kr) P_i(\cos\theta), \quad (3)$$

where $h_i$ and $P_i$ denote the spherical Hankel function and the Legendre function, respectively. Note that because of the axisymmetry the dependence of $\psi$ on the azimuth angle $\phi$ is omitted.

Since the functions $\phi_i$ are orthogonal on the spherical surface, we can directly set $\psi_i^* = \psi_i$. The coefficients $C_i$ associated with $\psi_i^*$ are determined by requiring $p^*$ to satisfy the pressure boundary condition at the measurement points. Suppose that an N term expansion in Eq. (1) is used, and that M measurements are taken, where $M \geq N$. Then we have M-simultaneous algebraic equations for N unknowns. The errors involved in $C_i$ are minimized by the least squares method and their results are given by $$\{C\}_{N \times 1} = [\Im]_{N \times M}^u \{\beta\}_{M \times 1}, \quad (4)$$

where $$[\Im]_{N \times M}^u$$

represents a pseudoinverse, and the elements of $[\Im]$ and $\{\beta\}$ are specified in Part I of this paper.

Table 1 lists the calculated values of the first eight coefficients $C_i$ for the dilating sphere at $ka=1$ and $V_s=1$ (m/s), which agree very well with the exact solution. In particular, numerical results show that we actually only need one term expansion to approximate the radiated acoustic pressure p. In other words, the acoustic pressure on the surface of a dilating sphere can be reconstructed, theoretically, by taking one measurement in the field only. Of course in practice we would take a few measurements in order to minimize the errors involved in the approximation.

TABLE 1

Calculated coefficients $C_i$ for a dilating sphere.

| $C_i$ | Calculated Values | Exact Values |
| --- | --- | --- |
| $C_0$ | (+6.908E-01, −1.505E-01) | (+6.909E-01, −1.506E-01) |
| $C_1$ | (−6.894E-17, −2.032E-17) | (0.0, 0.0) |
| $C_2$ | (−1.205E-17, −1.284E-16) | (0.0, 0.0) |
| $C_3$ | (+5.305E-18, +7.209E-17) | (0.0, 0.0) |
| $C_4$ | (+1.104E-18, −1.316E-17) | (0.0, 0.0) |
| $C_5$ | (+5.591E-19, +8.403E-19) | (0.0, 0.0) |
| $C_6$ | (+1.568E-19, −2.702E-19) | (0.0, 0.0) |
| $C_7$ | (+2.549E-21, −8.933E-20) | (0.0, 0.0) |

Next, we consider the case of an oscillating sphere. The complex amplitude of the radiated acoustic pressure in this case is given by (Pierce, 1981)

$$p = \frac{-ka(kr+i)\rho c V_{scos}\theta}{2-(ka)^2-i2ka} \left(\frac{r}{r}\right)^2 e^{ik(r-a)}, \quad (5)$$

where $$\cos\theta = \vec{n} \cdot \vec{e}_R, \text{ here } \vec{n}$$

is the unit normal on the surface and $$\vec{e}_R$$

is the unit normal in the direction of wave propagation from the source to the receiver.

To reconstruct the acoustic field on the surface of the oscillating sphere, we follow the same procedures as those outlined in the above. Table 2 shows the comparison of the calculated values of the first eight coefficients $C_i$ with the exact solution at $ka=1$ and $V_s=1$ (m/s). As in the first case, we only need one term in the expansion to approximate the radiated acoustic pressure; or equivalently, only one measurement to reconstruct the acoustic field.

TABLE 2

Calculated coefficients $C_i$ for an oscillating sphere.

| $C_i$ | Calculated Values | Exact Values |
|---|---|---|
| $C_0$ | (−1.268E-17, −1.878E-18) | (0.0, 0.0) |
| $C_1$ | (+4.446E-01, +4.782E-02) | (+4.446E-01, +4.783E-02) |
| $C_2$ | (+1.709E-17, −1.101E-19) | (0.0, 0.0) |
| $C_3$ | (+5.002E-18, −2.440E-18) | (0.0, 0.0) |
| $C_4$ | (−5.752E-19, −3.106E-18) | (0.0, 0.0) |
| $C_5$ | (−2.350E-19, +9.092E-18) | (0.0, 0.0) |
| $C_6$ | (−1.067E-19, +2.462E-19) | (0.0, 0.0) |
| $C_7$ | (−1.490E-18, +2.270E-18) | (0.0, 0.0) |

The third example is a vibrating piston set in a sphere. The distribution of the surface velocity is given by $$V_S(\theta) = \begin{cases} V_0 & 0 \leq |\theta| < \theta_0, \\ 0 & \text{elsewhere} \end{cases} \quad (6)$$

where $2\theta_0$ is the vertex angle of the piston. The analytic solution for the radiated acoustic pressure is given by Morse and Ingard (1986) in terms of a series expansion. The accuracy of the result in this case depends on the vertex angle $2\theta_0$ and the dimensionless wavenumber ka. The larger the values of $2\theta_0$ and ka are, the more terms in the expansion are needed.

Table 3 demonstrates the comparison of the calculated values of the coefficients $C_i$ with the analytic ones given by Morse and Ingard for $2\theta_0=45°$, ka=1, and $V_0=1$ (m/s). An excellent agreement is obtained once again. In particular, the convergence is achieved with five terms in the expansion, which means that the acoustic pressure on the surface of the sphere can be reconstructed with only five measurements in the field.

TABLE 3

Calculated coefficients $C_i$ for a piston set in a sphere.

| $C_i$ | Calculated Values | Exact Values |
|---|---|---|
| $C_0$ | (+2.583E-02, −8.514E-03) | (+2.584E-02, −8.515E-03) |
| $C_1$ | (+4.970E-02, +4.263E-03) | (+4.971E-02, +4.264E-03) |
| $C_2$ | (+1.647E-02, +1.041E-04) | (+1.646E-02, +1.042E-04) |
| $C_3$ | (+2.918E-03, −1.601E-06) | (+2.917E-03, −1.602E-06) |
| $C_4$ | (+3.529E-04, −2.382E-08) | (+3.528E-04, −2.383E-08) |
| $C_5$ | (+3.106E-05, −1.882E-11) | (+3.107E-05, −1.883E-11) |
| $C_6$ | (+2.108E-06, +1.628E-11) | (+2.107E-06, +1.627E-11) |
| $C_7$ | (+1.022E-07, −6.449E-12) | (+1.023E-07, −6.448E-12) |

(ii) Sources with non-separable coordinates

Spherical sources as discussed above have separable geometries and therefore, analytical solutions for the radiated acoustic pressures can be solved by using the method of separation of variables. In order to examine the feasibility of the HELS method for sources of non-separable coordinates, we consider a short cylinder 70 with two spherical endcaps 72 for which there exist no closed-form solutions, shown in FIG. 3.

To demonstrate the use of the HELS method, we first select a velocity distribution $V_s$ on the source surface and then solve the surface acoustic pressure $p_s$ by using the BEM-based Kirchhoff integral formulation (Wang, 1995), $$\{p_s\}=([A]-2\pi[I])^{-1}[B]\{V_s\}, \quad (7)$$

where [I] is the identity matrix, and the elements of the matrices [A] and [B] are given by $$A_{mj}^\alpha = \int_{S_m} N_\alpha(\xi) \frac{\partial R_j(\xi)}{\partial n_j(\xi)} \frac{(ikR_j(\xi)-1)e^{ikR_j(\xi)}}{R_j^2(\xi)} J(\xi)d\xi, \quad (8a)$$

$$B_{mj}^\alpha = \int_{S_m} N_\alpha(\xi) ikp \frac{ce^{ikR_j(\xi)}}{R_j(\xi)} J(\xi)d\xi, \quad (8b)$$

where $J(\xi)$ is the Jacobian of the transformation from the global to the local coordinates. $S_m$ is the area of the mth segment divided on the surface, $R_j(\xi)$ is the distance from the jth node to every point on the mth area segment, and $N_\alpha(\xi)$ are the second-order shape functions of the local coordinates $(\xi)=(\xi_1,\xi_2)$ (Wang, 1995).

In the following numerical examples, the radius of the cylinder 70 is set at a=1 (m) and the half length of the cylinder is b=0.5 (m). In solving the surface acoustic pressure using Eq. (7), the surface is divided into 216 quadrilateral segments with 753 nodal points. Once the surface acoustic pressure is determined, the field acoustic pressure can be calculated by the Kirchhoff integral formulation (Wang, 1995)

$$4\pi\{p\}=[A]\{p_s\}-[B]\{V_s\}. \quad (9)$$

Figure 3:
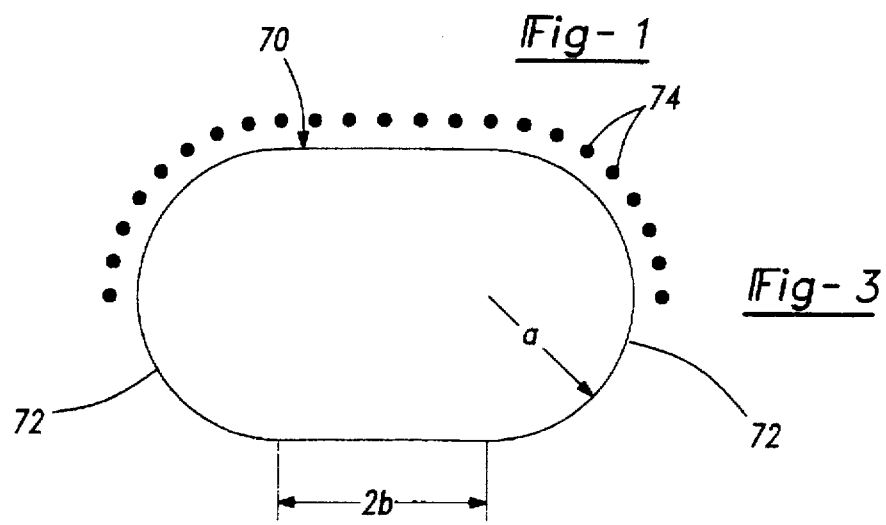
FIG. 3 is a schematic showing the locations of measurements with respect to the short cylinder with two spherical end caps.

In calculating the field acoustic pressure p, the field measurement points 74 are selected to lie along a line parallel to the generator of the cylinder 70 at a distance of 0.1 (m) away from the surface, as shown in FIG. 3. The values of p thus calculated are taken as the measured data and used to reconstruct the surface acoustic pressure $p_s$, which are subsequently compared with those obtained from Eq. (7).

The first example deals with a vibrating cylinder 70 with a uniform velocity distribution over the entire surface. The surface and field acoustic pressures are calculated by Eqs. (7) and (9), respectively. The approximate solution for the acoustic pressure is expressed as a series expansion, Eq. (1). Note that in this case the closed-form particular solution $\psi$ cannot be found because the finite cylinder has non-separable coordinates. However, in the far field the radiated acoustic pressure obeys the spherical spreading law. Hence it is appropriate to use the particular solutions $\psi_i$ for a spherical source as an approximation. The independent functions $\psi_i^*$ must still be orthonormalized with respect to the cylindrical surface. The inner products involved in Eq. (13) of the FUNDAMENTAL THEORY section must be taken over the entire cylindrical surface. In carrying out these surface integrals, the Gaussian quadrature with double precision are used. As usual, the accuracy of the surface integral increases with the number of segments divided on the surface and the number of internal integration points. Once $\psi_i^*$ are specified the coefficients $C_i$ can be determined by requiring p* to match the field acoustic pressure p. The errors involved are minimized by the least squares method.

Figure 4:
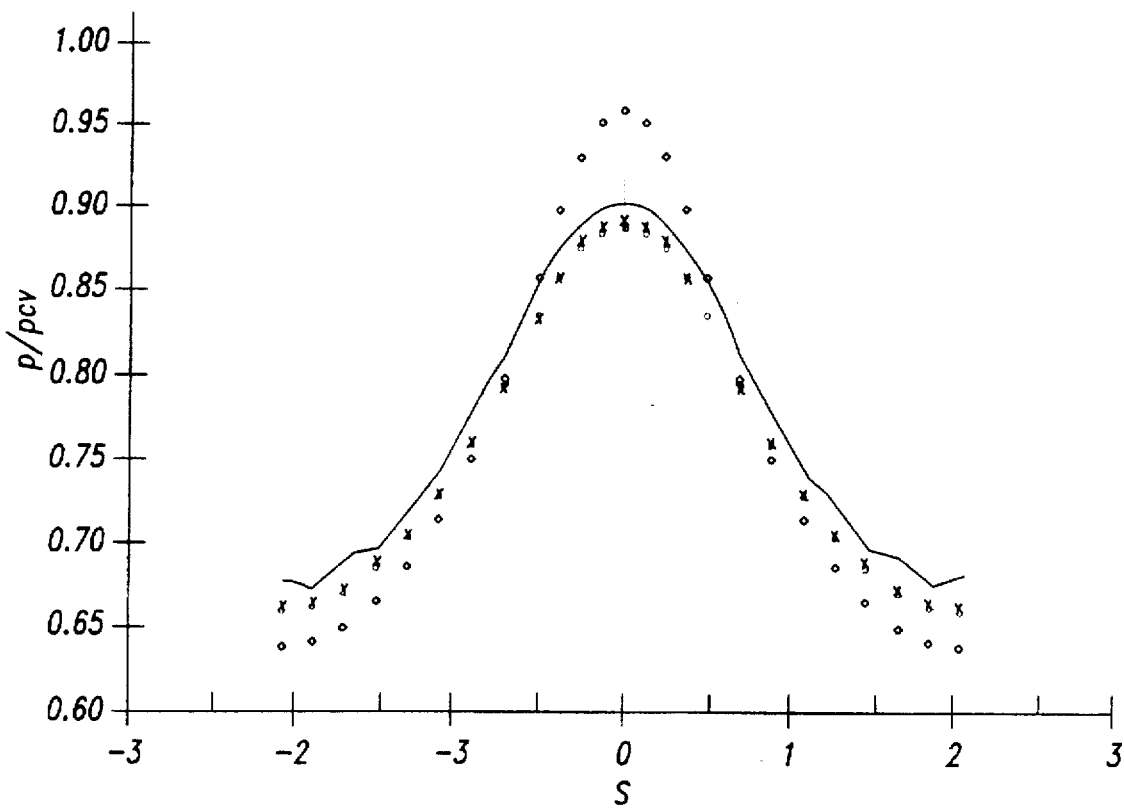
FIG. 4 shows the comparison of the reconstructed acoustic pressure distribution and the initially calculated one on the surface of the cylinder.

FIG. 4 shows the comparison of the reconstructed acoustic pressure distribution p* and the initially calculated one $p_s$ on the surface of the cylinder 70 at ka=1. All acoustic pressures are nondimensionalized with respect to $pcV_s$ and plotted along the source generator S. Numerical results demonstrate that the acoustic pressure on the surface can be reconstructed successfully with only a few measurements, or equivalently, a few terms in the expansion in Eq. (1). In FIG. 4, a ◊ denotes a reconstruction of the surface acoustic pressure with two terms in the expansion or, equivalently, two measurements of the radiated acoustic pressure in the field, a ○ implies a reconstruction with three terms, and a x with five terms in the expansion. Results show that the accuracy of the reconstruction increases with the number of terms taken in the expansion. With N=5, the maximum error in the reconstruction is already less than five percent.

Figure 5:
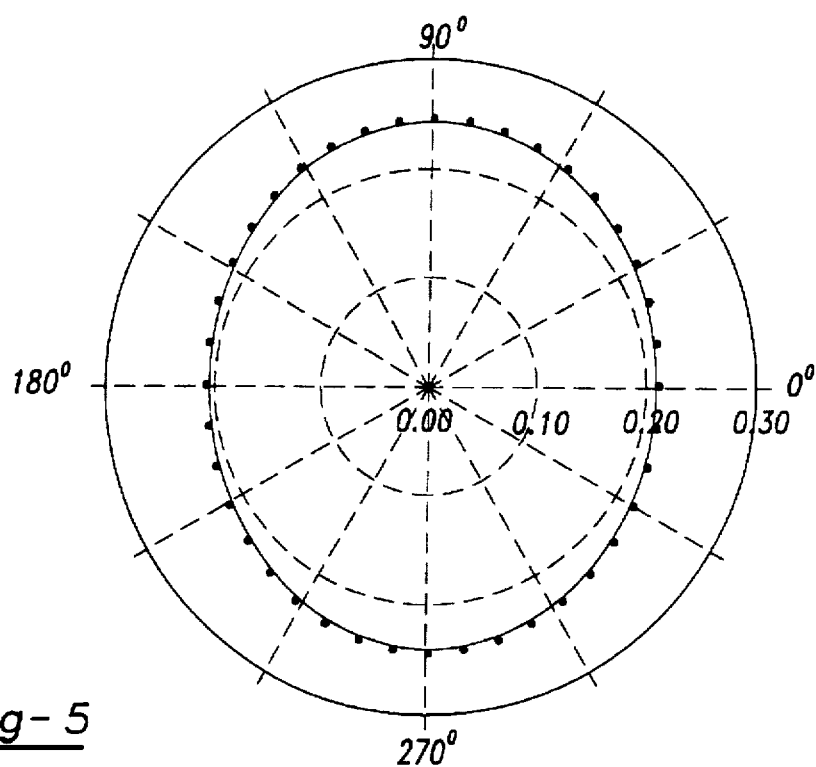
FIG. 5 shows the comparison of the calculated acoustic pressure in the approximated one over a circle of radius r=4.

The approximate solution given by Eq. (1) also allows one to predict the radiated acoustic pressure in the field. FIG. 5 depicts the comparison of the calculated acoustic pressure (solid line) using Eq. (9) and the approximated one (dots) over a circle of radius r=4 (m). The agreement between the two results is remarkable. The radiation pattern in this case resembles that of a dilating sphere except with some extra radiation from the side wall of the cylinder.

Figure 6:
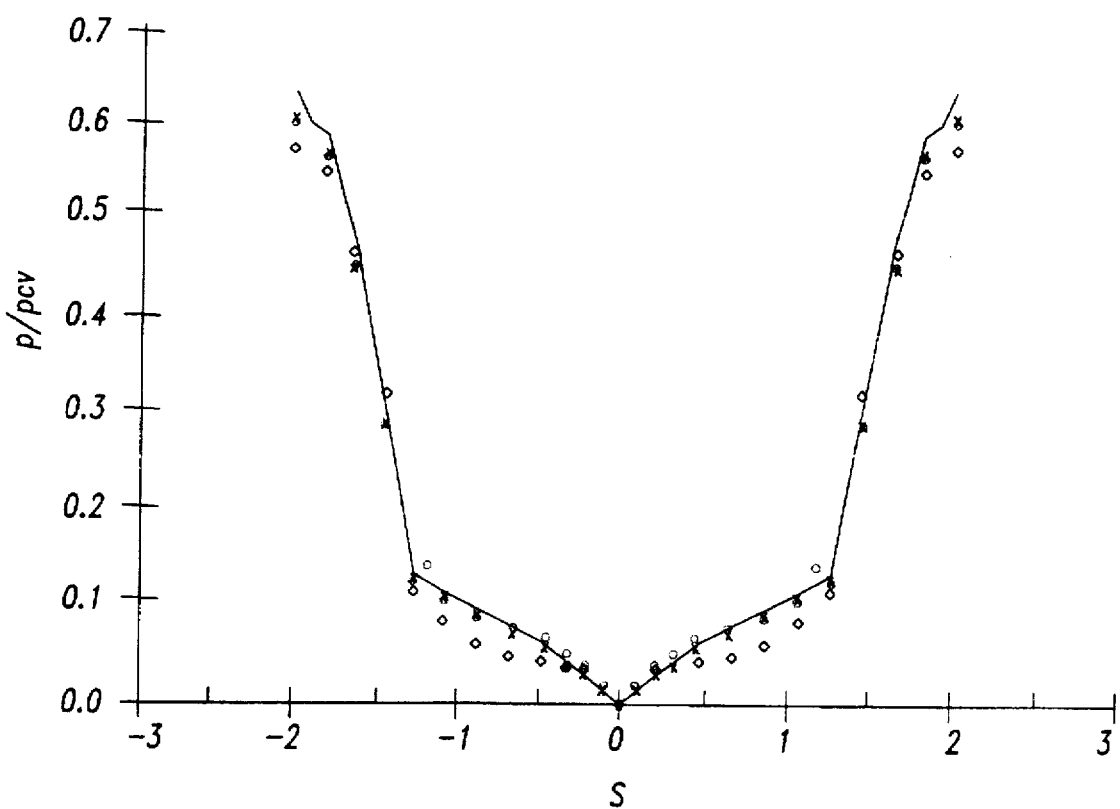
FIG. 6 shows the comparison of the initially calculated surface acoustic pressure and the reconstructed one.

The second example is concerned with the same cylinder, but oscillating back and forth along the z-axis direction at ka=1. The same procedures as those described in the above are followed. FIG. 6 demonstrates the comparison of the initially calculated the surface acoustic pressure and the reconstructed one. In FIG. 6, a ◊ depicts the results of using a four-term, a ○ the results of using a six-term, and a x the results of using an eight-term expansion. The maximum error in reconstruction with an eight-term expansion is found to be less than five percent.

Figure 7:
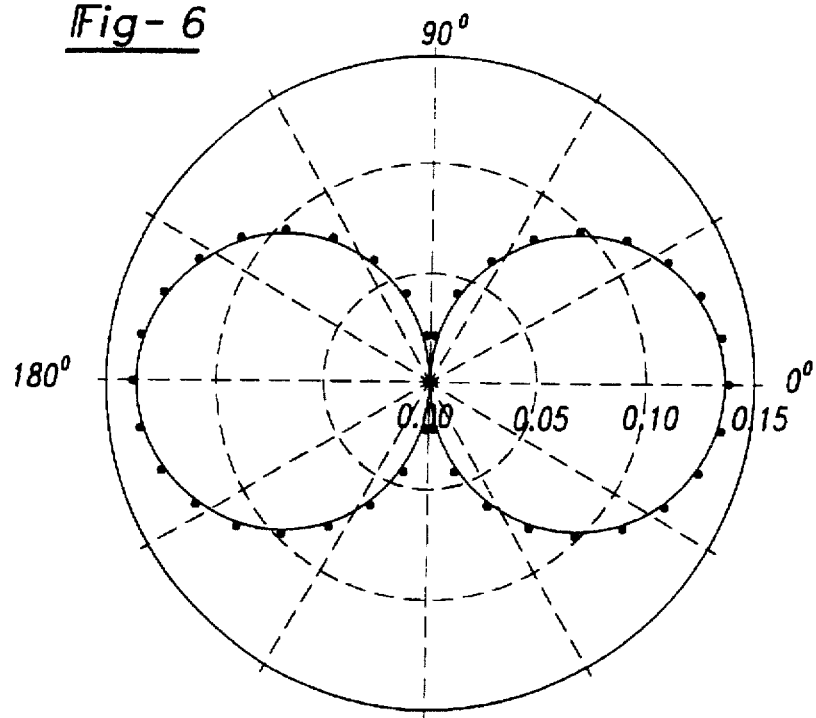
FIG. 7 shows a comparison of the calculated field acoustic pressure in the approximated one using an 8-term expansion over a circle of radius 4.

FIGS. 7 shows the comparison of the calculated field acoustic pressure (solid line) and the approximated one (dots) using an eight-term expansion over a circle of radius 4 (m). A good agreement is achieved. The radiation pattern in this case resembles that of an oscillating sphere. At higher frequencies, more side lobes are expected (Wang and Wu, 1994) because of the effect of reflection from the side wall of the cylinder.

The last example is concerned with a vibrating piston set in one of the spherical endcaps of the cylinder. The piston has a vertex angle of $2\theta_0=60°$ and vibrates at an amplitude of $V_0$ at ka=1. The rest of the surface is stationary.

$$V_s(\theta) = \begin{cases} V_0 & 0 \leq |\theta| < 30° \\ 0 & \text{elsewhere} \end{cases} \quad (10)$$

The procedures involved in generating the field acoustic pressures and in reconstructing the surface acoustic pressure are exactly the same as those described in the above.

Figure 8:
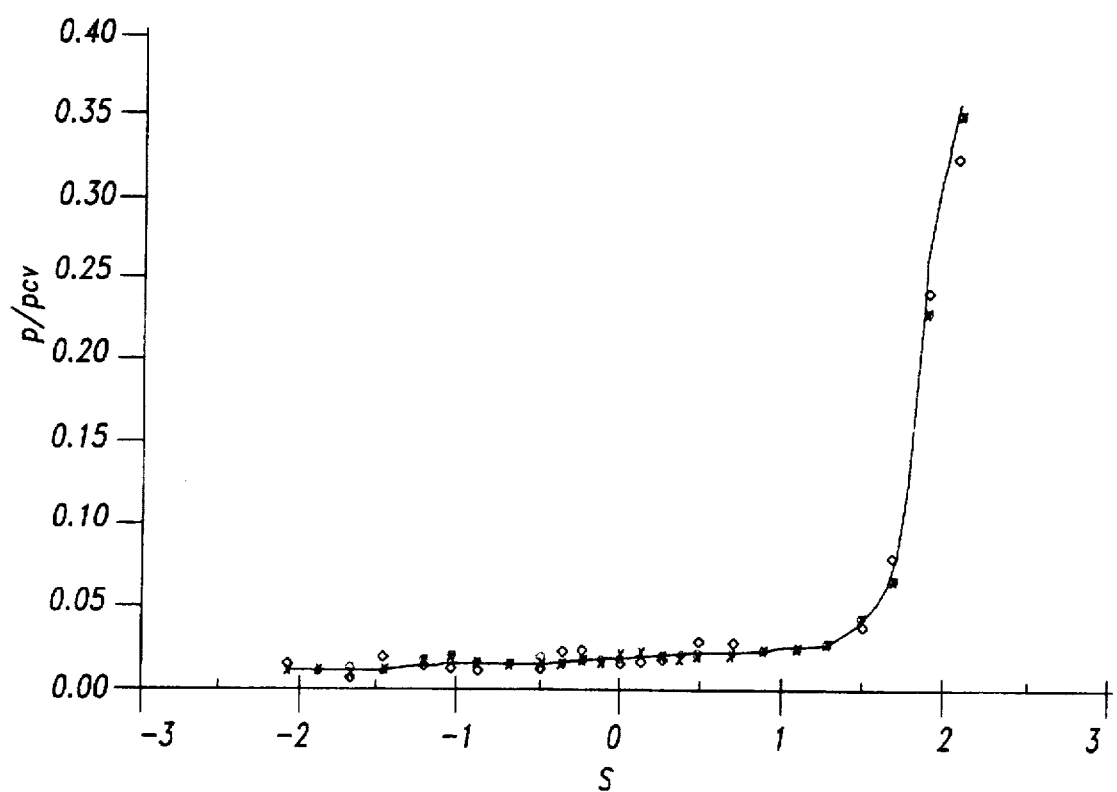
FIG. 8 shows the comparison of the calculated dimensionless surface acoustic pressure and the reconstructed one along the source generator.

FIG. 8 demonstrates the comparison of the calculated dimensionless surface acoustic pressure (solid line) and the reconstructed one along the source generator S. A ◊ represents the result of using a ten-term, a ○ the result of using a fourteen-term, and a x the result of using an eighteen-term expansion. Because of the complexity of the problem, more terms are required to ensure the accuracy of the result. The maximum error in the reconstruction with an eighteen-term expansion is found to be less than twelve percent.

Figure 9:
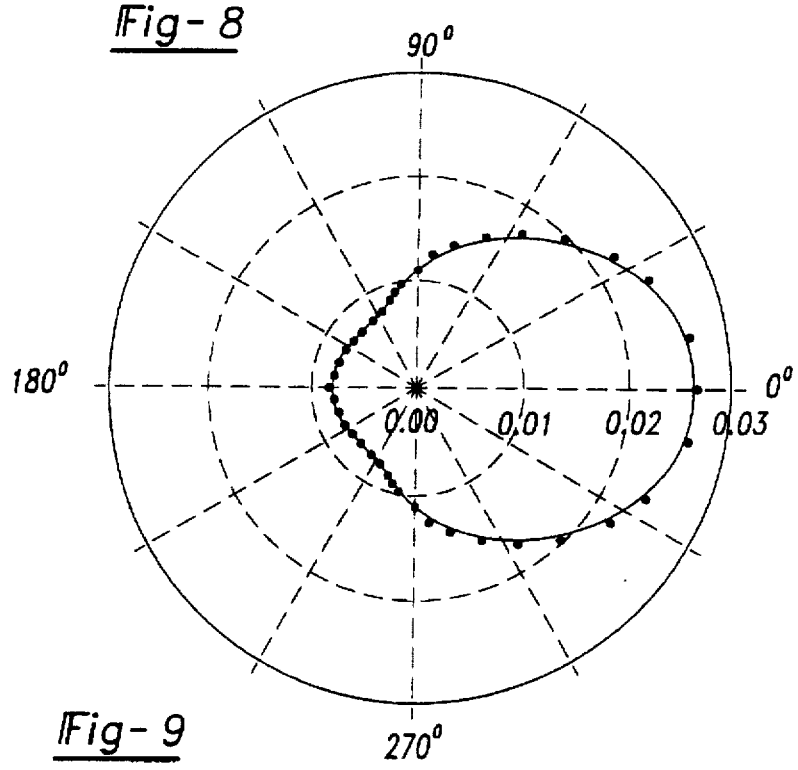
FIG. 9 shows the comparison of the approximated field acoustic pressures using an 18-term expansion with the calculated ones over a circle of radius r=4.

FIGS. 9 illustrates the comparison of the approximated field acoustic pressures (dots) using an eighteen-term expansion with the calculated ones (solid line) over a circle of radius r=4 (m). The agreement is excellent. The radiation pattern in this case resembles that of a vibrating piston set in a sphere (Morse and Ingard, 1986).

VII. Sensitivity Analysis

In the conventional Kirchhoff integral formulation approach, reconstruction of the acoustic pressure on the source surface has been found to be very sensitive to the accuracy of the measurements. Because of the inherent ill-posedness difficulty in this approach, any slight inaccuracy in the measurements will lead to an enormous error in the reconstruction. Hence measurements must be taken at an extremely close distance to include the evanescent wave effect, and the dynamic range of the measurement device must be very large to ensure a high signal to noise ratio. In many applications, these requirements render this type of approach impractical.

With the HELS method, these requirements are no longer necessary. The measurement points can be selected at any point in the field, so long as they do not overlap each other. To examine the robustness of the HELS method, we here intentionally introduce some bias and random errors into the measurements, and then use these erroneous data to reconstruct surface acoustic pressures.

In practice, the bias error may be due to system errors which may be corrected by calibration. On the other hand, the random error may be due to random fluctuations which may be reduced by taking more averages in the measurements. In this sensitivity analysis, the bias errors are introduced by multiplying the calculated field acoustic pressures by a constant, for example, 1.05 for a five-percent bias error. Similarly, random errors are introduced by multiplying the field acoustic pressures by a random number sequence scaled to the range of one plus or minus a nominal error. For example, a five-percent random error is generated by a random sequence of numbers between 0.95 and 1.05. These numbers are then multiplied by the field acoustic pressure values.

The first two examples of the sensitivity analysis are concerned with a dilating sphere and an oscillating sphere. Since in these cases the closed-form solutions are available, the bias and random errors are introduced by multiplying the exact values of the field acoustic pressures by some preselected constants or random number sequences.

Figure 10:
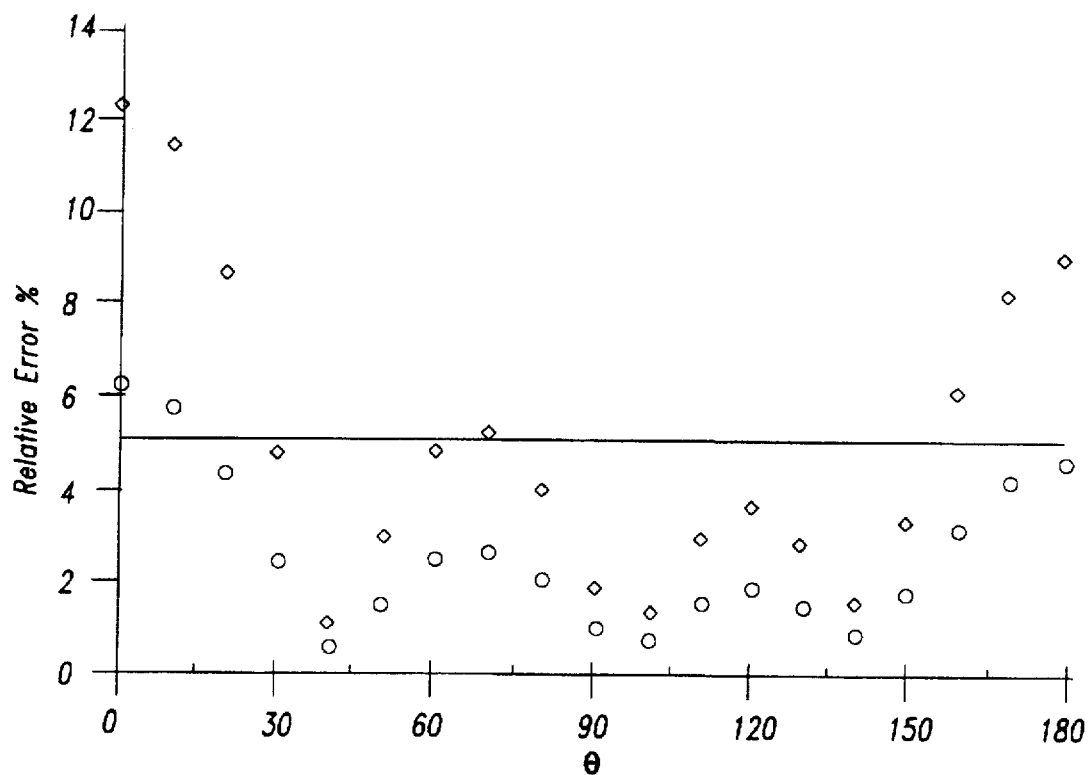
FIG. 10 shows the relative errors in reconstruction of surface acoustic pressure for a dilating sphere.
Figure 11:
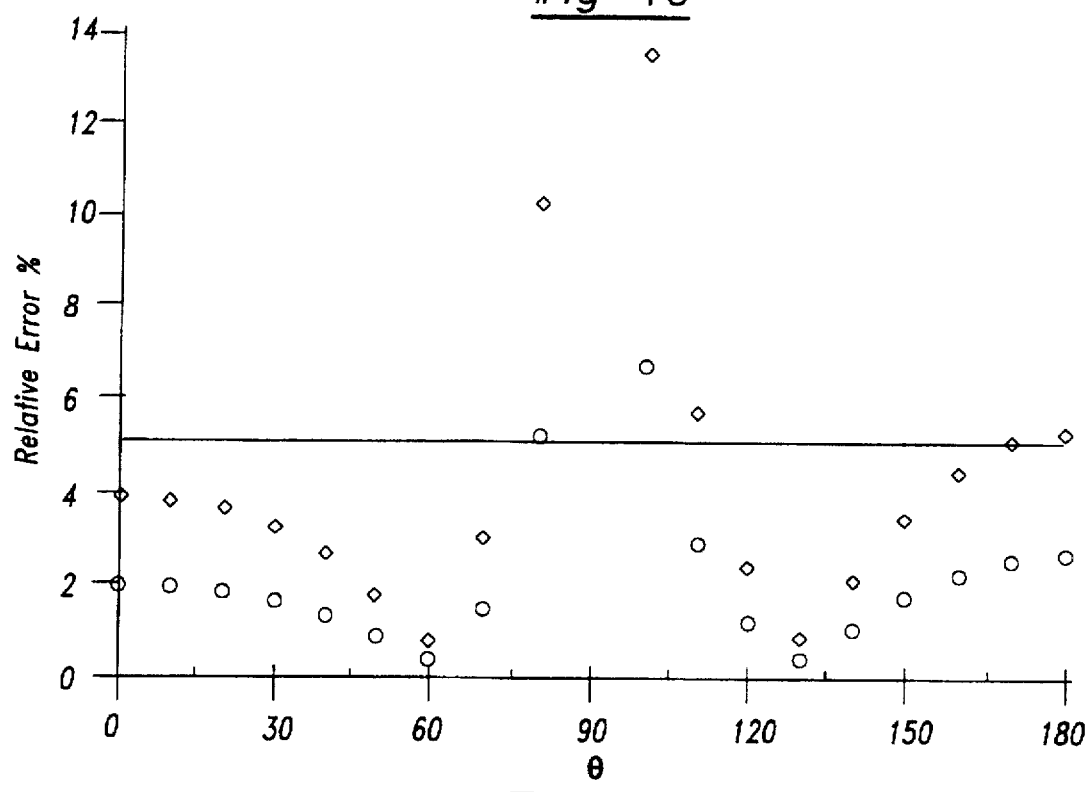
FIG. 11 shows relative errors in reconstruction of surfaced acoustic pressures on an oscillating sphere.

FIGS. 10 and 11 show the relative errors in reconstruction of surface acoustic pressures for a dilating sphere, an oscillating sphere, and a vibrating piston set in a sphere based on these erroneous input data. In these graphs, the horizontal axes represent the generator of the spherical surface expressed in terms of the polar angle $\theta$ varying from 0° to 180°, and the vertical axes are the relatively errors with respect to the exact surface acoustic pressures. The solid lines denote the relative errors in reconstruction due to a five percent bias error, and the dashed lines represent the relative errors due to a ten-percent bias error in the input. Numerical results show that the same magnitudes of bias errors are transferred to reconstruction without any amplification.

FIGS. 10 and 11 also demonstrate the relative errors in reconstruction of the surface acoustic pressures due to a five-percent and a ten-percent random errors in the input, respectively. A ○ in these graphs represents the relative errors in the reconstruction cue to a five-percent random error, and a ◊ indicates the relative errors due to a ten-percent random error in the input. Numerical results demonstrate that the average levels of relative errors in reconstruction are actually lower than those in the input. This implies that the random errors have been effectively reduced by the least squares method. The largest relative error, about 13.8%, is seen at around $\theta=90°$ for an oscillating sphere. This is because the amplitude of the acoustic pressure is very small there, hence any round-of error in the computations could lead to a large error in the final results. This roundoff error can be further reduced by increasing the number of segments discretized on the surface and the number of measurements taken in the field.

Next, we perform the sensitivity analysis on sources with non-separable coordinates. As before, we consider a vibrating cylinder, an oscillating cylinder, and a vibrating piston set in one of the spherical endcaps of a cylinder. Because of the lack of the analytical solutions, the field acoustic pressures are calculated numerically using Eq. (9). Therefore there are inherent errors in the input to begin with. When these erroneous data are used to reconstruct surface acoustic pressures, the results are expected to be inaccurate.

In what follows, we first examine the relative errors in reconstruction due to the inherent errors in the input data. The relative error in this case is defined as the ratio of the absolute value of the difference of the numerical results obtained by using Eqs. (1) and (7) to that of Eq. (7). The solid lines in FIGS. 12 to 14 demonstrate the relative errors of the reconstructed surface acoustic pressures of a vibrating cylinder, an oscillating cylinder, and a vibrating piston set in one of the spherical endcaps of a cylinder, respectively. The average levels of the relative errors are less than two percent for a vibrating cylinder (see FIG. 12), five percent for an oscillating cylinder (see FIG. 13), and seven percent for a vibrating piston in a cylinder (see FIG. 14). The largest error occurs around θ=90° for an oscillating cylinder for the same reason as that of an oscillating sphere. These inherent errors can be reduced further by increasing the number of segments discretized on the cylindrical surface and the number of internal points in the Gaussian quadrature.

Figure 12:
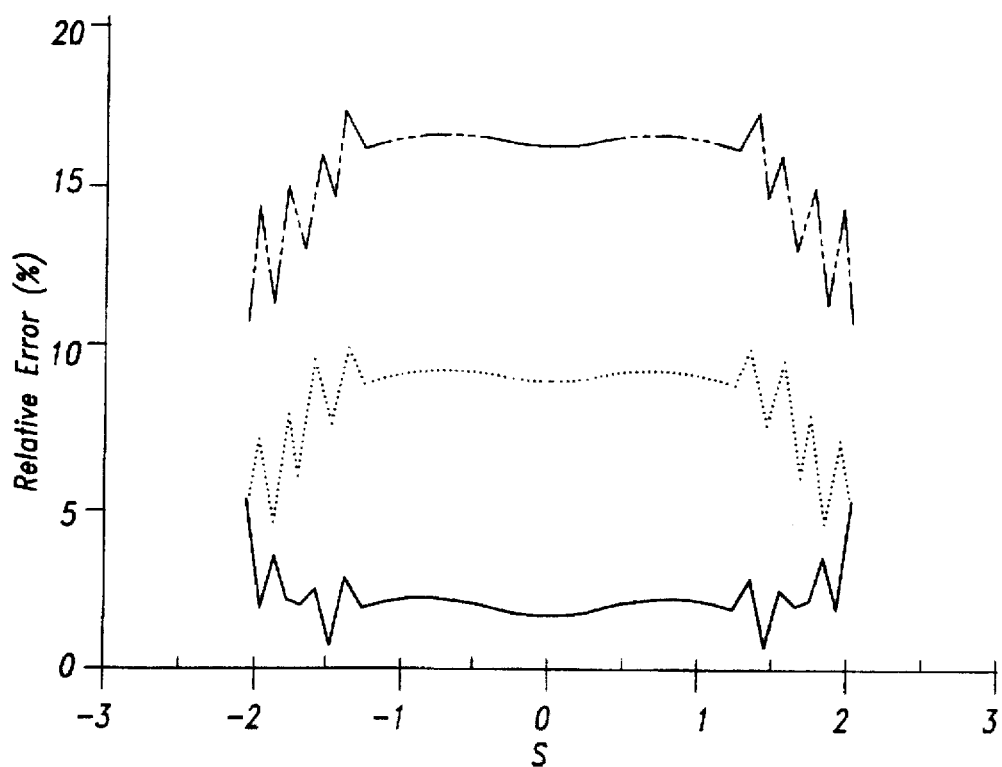
FIG. 12 shows the relative errors in reconstruction of surfaced acoustic pressure on a vibrating cylinder with two spherical end caps.
Figure 13:
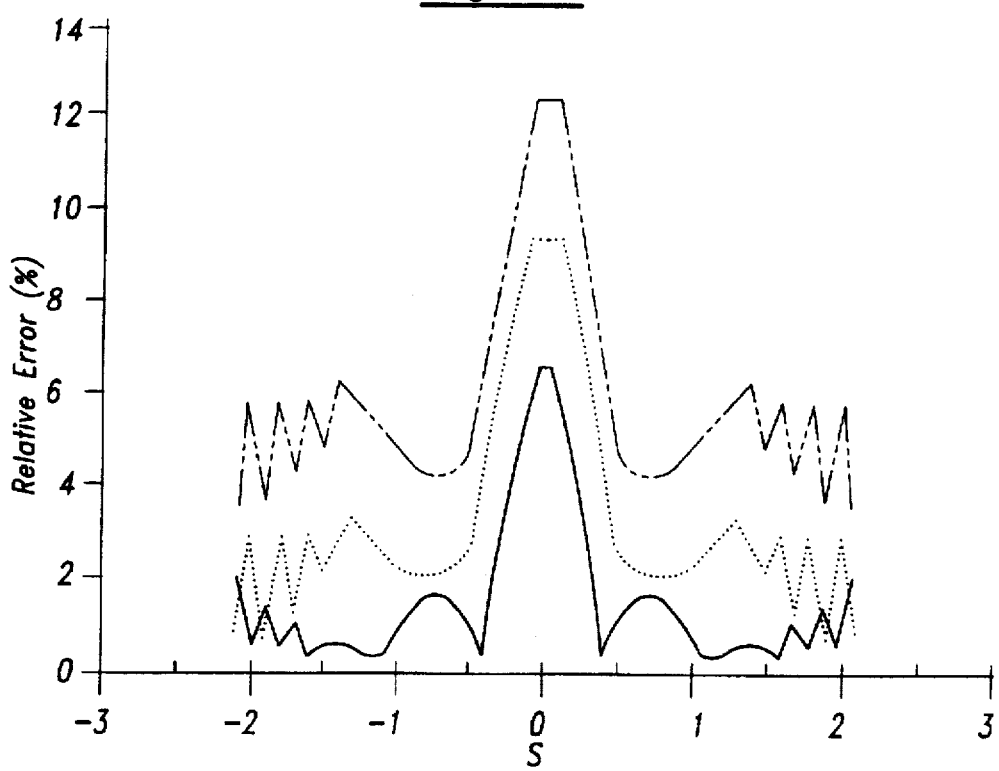
FIG. 13 shows the relative errors in reconstruction of surface acoustic pressures on an oscillating cylinder with two spherical end caps.
Figure 14:
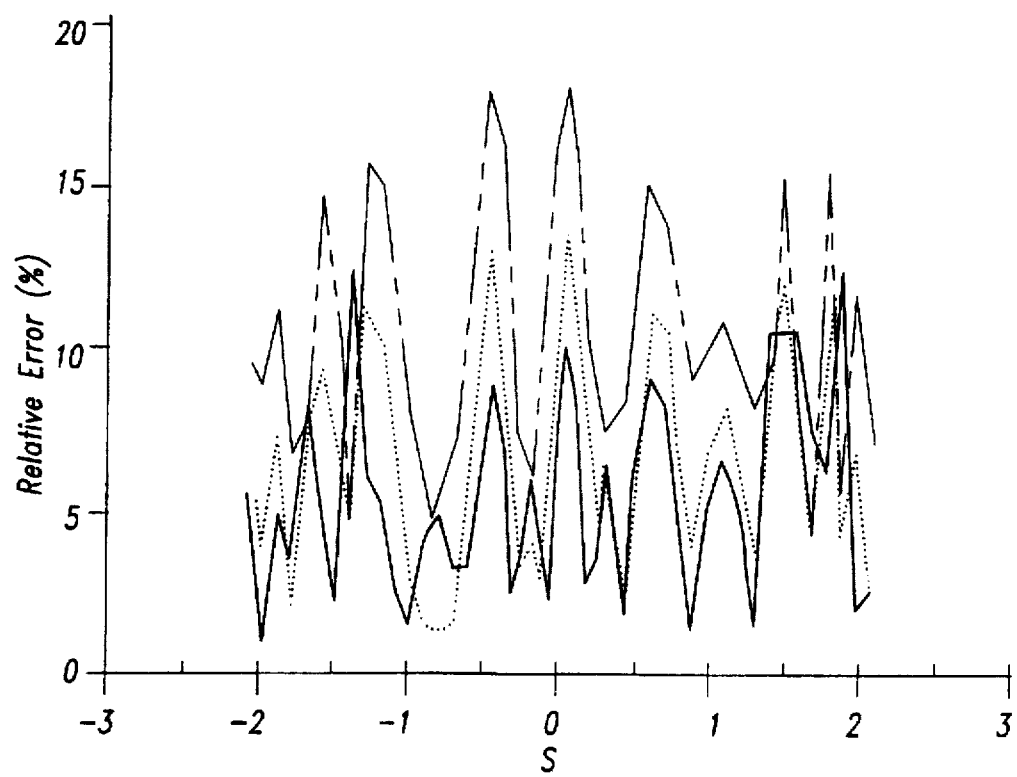
FIG. 14 shows the relative errors in reconstruction of surface acoustic pressures on a cylinder with a vibrating piston set in one endcap.

Now we introduce the bias and random errors to the already inaccurate input data and then reconstruct the surface acoustic pressures. The dashed and dotted lines in FIGS. 12 to 14 represent the relative errors in reconstruction of surface acoustic pressures for a vibrating cylinder, an oscillating cylinder, and a vibrating piston in a cylinder due to a five-percent and a ten-percent bias errors in the input, respectively. The average levels of the relative errors in reconstruction are six percent for a vibrating cylinder, eight percent for an oscillating cylinder, and ten percent for a vibrating piston set in a cylinder when a five-percent random errors are introduced into the input. The average levels of the relative errors in reconstruction are 12% for a vibrating cylinder, 13% for an oscillating cylinder, and 13% for a vibrating piston set in a cylinder when 10% random errors are introduced into the input. Note that these relative errors are caused by a combined effect of the inherent errors and the bias errors introduced into the input. It is interesting to note that the relative errors due to bias errors fluctuate in essentially the same patterns as those due to the inherent errors. In the cases of spheres as discussed above, there are no inherent errors. Hence the relative errors due to bias errors in the input remain constant.

Figure 15:
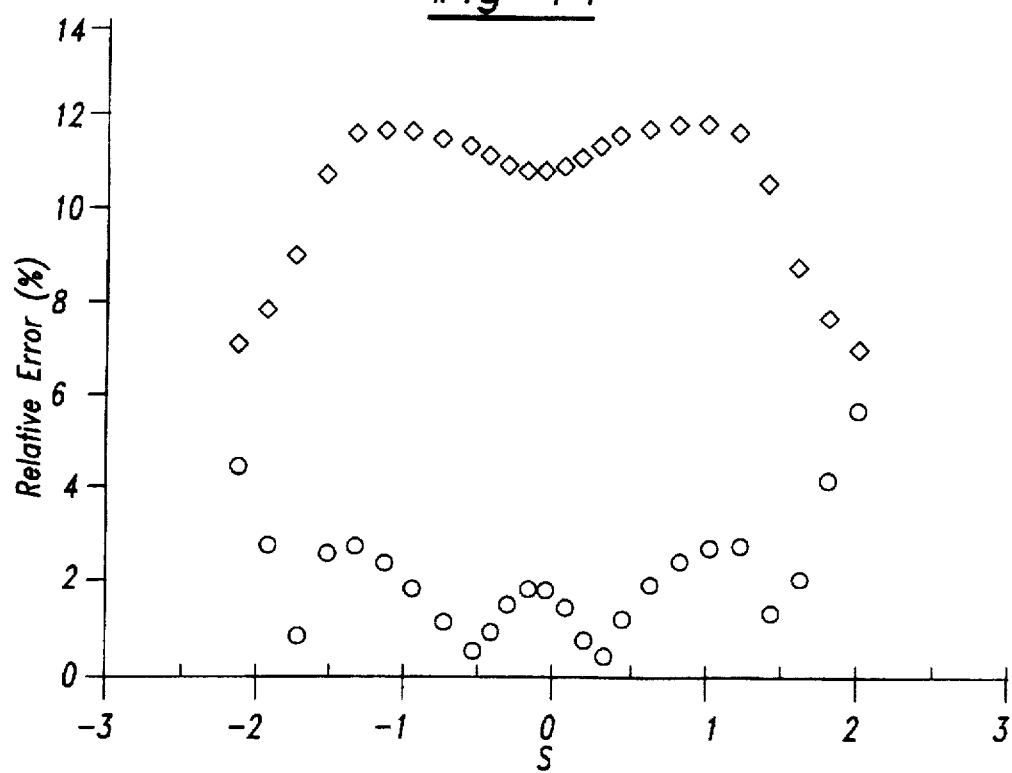
FIG. 15 shows the relative errors in reconstruction of surface acoustic pressures on a vibrating cylinder with two spherical endcaps.
Figure 16:
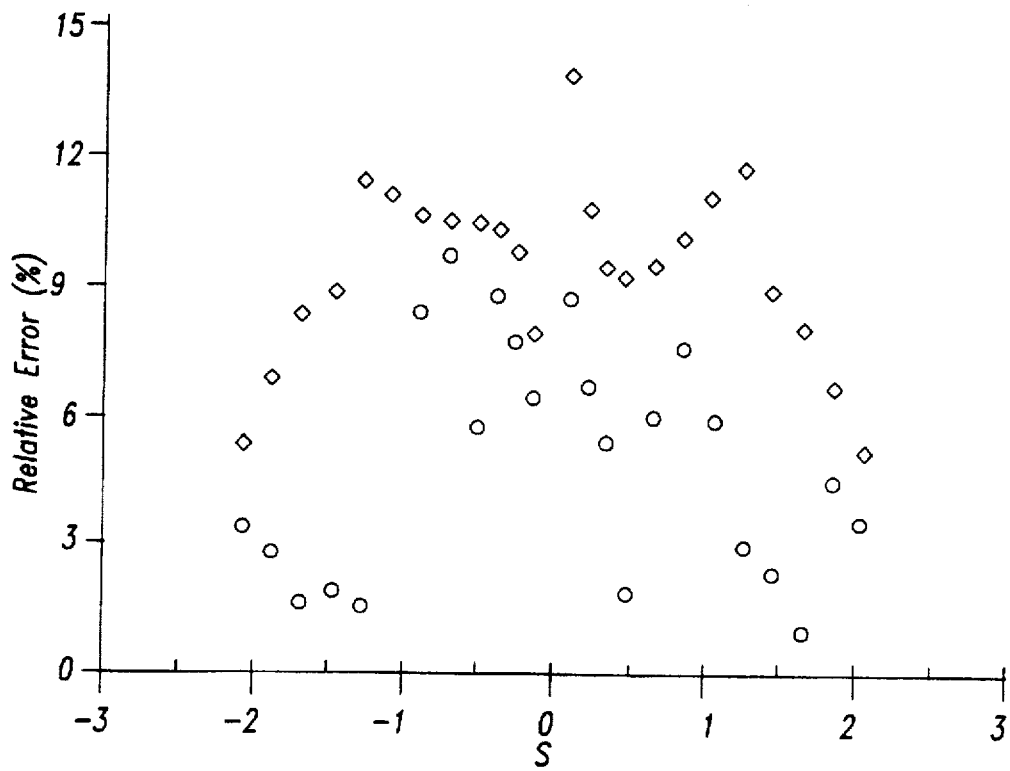
FIG. 16 shows the relative errors in reconstruction of surface acoustic pressures on an oscillating cylinder with two spherical endcaps.
Figure 17:
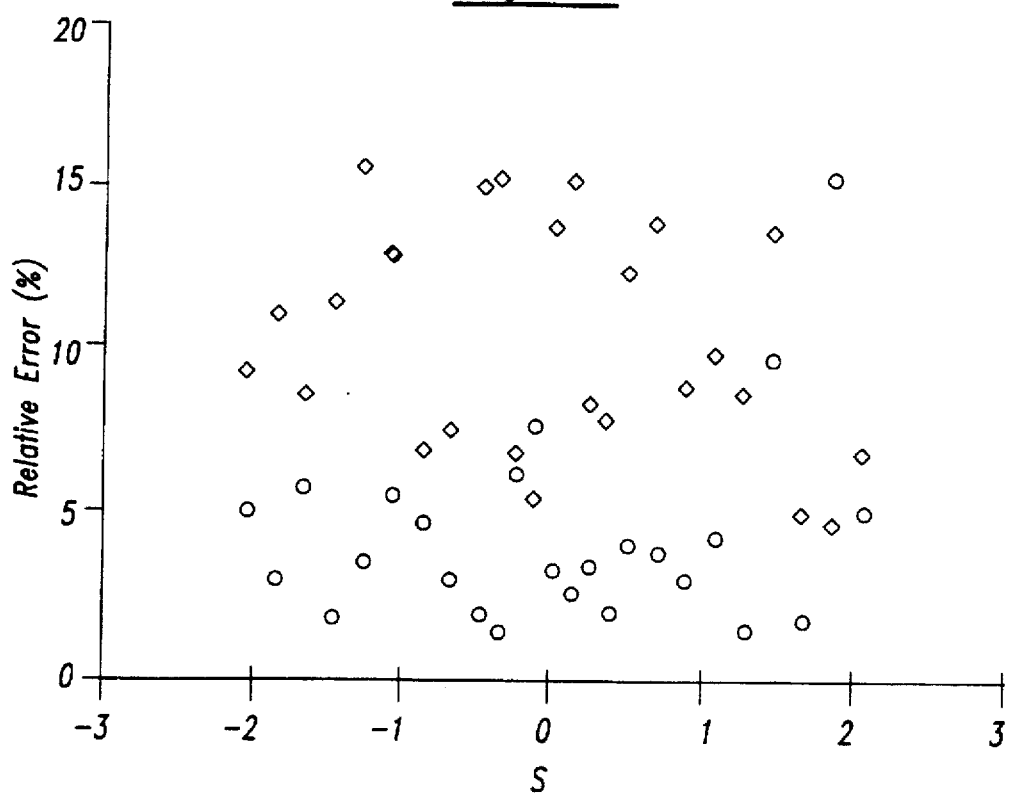
FIG. 17 shows the relative errors in reconstruction of surface acoustic pressures on a cylinder with a vibrating piston set in one endcap.

FIGS. 15–17 demonstrate the relative errors in reconstruction of surface acoustic pressures due to a five-percent and a ten-percent random errors, respectively. The average levels of the relative errors in reconstruction are two percent for a vibrating cylinder, five percent for an oscillating cylinder, and five percent for a vibrating piston set in a cylinder when five percent random errors are introduced into the input. The average levels of the relative errors in reconstruction are 10% for a vibrating cylinder, 11% for an oscillating cylinder, and 12% for a vibrating piston set in a cylinder when 100 random errors are introduced into the input. Once again, these relative errors are the results of a combined effect of the inherent errors and the random errors introduced into the input data. As in the cases of spheres, the average levels of the relative errors in reconstruction due to random errors are actually lower than those due to bias errors. This indicates that the random errors have been effectively reduced by the least squares method.

The examples exhibited above demonstrate that the HELS method has a much higher tolerance in inaccuracy in the input data than the BEM-based Kirchhoff integral formulation approach. Such a feature can be very appealing because in engineering applications all measurements contain certain levels of uncertainties.

Numerical results demonstrate that the HELS method is robust, and can yield satisfactory results in reconstructing the acoustic pressure on the source surface with only a few measurements in the field. It has no restriction on where to take the measurement point and is applicable to sources with both separable and non-separable coordinates. The accuracy of reconstruction using the HELS method increases with the number of terms used in the expansion, or equivalently, the number of field measurements.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for diagnosing noise sources including the steps of:

measuring sound at a plurality of measurement points around said noise sources;

determining the amplitude at a plurality of frequencies of said sound at said measurement points; and reconstructing the acoustic field at points other than said measurement points based upon said amplitude at said plurality of frequencies of said sound at said points by solving the Helmholtz equation.

2. The method for diagnosing noise sources of claim 1 including the step of reconstructing the acoustic field on the surface of said noise sources.

3. The method for diagnosing noise sources of claim 1 wherein said method is utilized to solve an interior problem.

4. The method for diagnosing noise sources of claim 1 further including assuming the acoustic pressure anywhere has the form:

$$p^* = \rho c \sum_{i=1}^{N} C_i \psi_i^*.$$

5. The method for diagnosing noise sources of claim 4 further including the step of solving the coefficients $C_i$ using the least squares method.

6. The method for diagnosing noise sources of claim 4 further including the step of setting the field acoustic pressure $p^*$ equal to the measured field acoustic pressure $p$.

7. The method for diagnosing noise sources of claim 4 further including the step of generating the independent functions $\psi_i^*$ by using the Gram-Schmidt orthonormalization with respect to $\psi$ over the source surface.

8. The method for diagnosing noise sources of claim 7 wherein said independent functions include the Hankel function having a real part and an imaginary part, said method further including the step of setting said imaginary part of said Hankel function to zero.

9. The method for diagnosing noise sources of claim 7 further including selecting a particular solution to the Helmholtz equation in spherical coordinates:

$$\psi_{m,n}(r,\theta,\phi) = h_m(kr) P_{n,m}(\cos\theta)^{\cos m\phi}_{\sin m\phi}.$$

10. The method for diagnosing noise sources of claim 7 further including selecting a particular solution to the Helmholtz equation in cylindrical coordinates.

11. A method for diagnosing noise sources including the steps of:

(a) measuring the field acoustic pressure $p$ at a plurality of measurement points around said noise sources;

(b) assuming the acoustic pressure anywhere has the form:

$$p^* = \rho c \sum_{i=1}^{N} C_i \psi_i^*,$$

where p and c are the density and speed of sound of the fluid medium, respectively, N is the total number of expansion terms, $C_i$ are coefficients associated with independent functions $\psi_i^*$;

(c) generating said independent functions $\psi_i^*$ by using the Gram-Schmidt orthonormalization with respect to $\psi$ over the source surface; and (d) setting the acoustic pressure p* equal to said measured field acoustic pressure p at said measurement points;

(e) solving said coefficients $C_i$ using the least squares method; and (f) reconstructing the acoustic field at points other than said measurement points by calculating:

$$p^* = \rho c \sum_{i=1}^{N} C_i \psi_i^*.$$

12. The method for diagnosing noise sources of claim 11 wherein said step (f) includes the step of reconstructing the acoustic field at the surface of said noise sources.

13. The method for diagnosing noise sources of claim 11 further including the step of selecting a particular solution to the Helmholtz equation in spherical coordinates:

$$\psi_{m,n}(r,\theta,\phi) = h_m(kr) P_{n,m}(\cos\theta)_{\sin m\phi}^{\cos m\phi}. \tag{11}$$

14. The method for diagnosing noise sources of claim 11 wherein said measurement points are in the interior of an enclosure.

15. The method for diagnosing noise sources of claim 14 wherein said independent functions include a Hankel function having a real part and an imaginary part, said method further including the step of setting said imaginary part of said Hankel function to zero.

16. A system for diagnosing noise sources comprising:
   a plurality of transducers, said transducers generating a signal indicative of the amplitude and frequency of sound at a plurality of measurement points;
   a signal analyzer receiving said signal from said transducers, said signal analyzer generating frequency-amplitude data based upon said signal from said transducers;
   means for reconstructing the acoustic field at points other than said measurement points based upon said frequency-amplitude data.

17. The system for diagnosing noise sources according to claim 16 wherein said means for reconstructing reconstructs the acoustic field on the surface of said noise sources.

18. The system for diagnosing noise sources according to claim 16, wherein said system solves an interior problem.

19. The system for diagnosing noise sources according to claim 16 wherein said means for reconstructing the acoustic field solves the Helmholtz equation to analyze the frequency-amplitude data from said signal analyzer.

20. The system for diagnosing noise sources according to claim 19 wherein said means for reconstructing utilizes the least-squares method to solve for coefficients.

21. The system for diagnosing noise sources according to claim 19 wherein said means for reconstructing assumes the acoustic pressure anywhere has the form:

$$p^* = \rho c \sum_{i=1}^{N} C_i \psi_i^*,$$

where p and c are the density and speed of sound of the fluid medium, respectively, N is the total number of expansion terms, $C_i$ are coefficients associated with independent functions $\psi_i^*$.

22. The system for diagnosing noise sources according to claim 21 wherein said means for reconstructing selects a particular solution to the Helmholtz equation in spherical coordinates:

$$\psi_{m,n}(r,\theta,\phi) = h_m(kr) P_{n,m}(\cos\theta)_{\sin m\phi}^{\cos m\phi}. \tag{11}$$

23. The system for diagnosing noise sources according to claim 22 wherein said means for reconstructing generates said independent functions $\psi_i^*$ by using the Gram-Schmidt orthonormalization with respect to $\psi$ over the source surface.

* * * * *